(12) United States Patent     (10) Patent No.:     US 7,567,204 B2
Sakamoto                      (45) Date of Patent:     Jul. 28, 2009

(54) METHOD FOR DETERMINING NOISE FLOOR LEVEL AND RADAR USING THE SAME

(75) Inventor: Mai Sakamoto, Kounan (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 12/077,594

(22) Filed: Mar. 19, 2008

(65) Prior Publication Data

US 2008/0231496 A1    Sep. 25, 2008

(30) Foreign Application Priority Data

Mar. 20, 2007    (JP) .............. 2007-072894

(51) Int. Cl.
G01S 7/35      (2006.01)
G01S 13/32     (2006.01)
G01S 13/00     (2006.01)
G01S 13/93     (2006.01)
G01R 29/26     (2006.01)

(52) U.S. Cl. .............. 342/91; 342/27; 342/70; 342/89; 342/118; 342/128; 342/175; 342/195; 342/196

(58) Field of Classification Search ........ 701/300, 701/301; 342/27, 28, 70–72, 89–103, 118, 342/128–133, 159–165, 173–176, 179, 189–197, 342/13–20; 375/242, 254, 271, 272, 279, 375/284–287, 316–319, 345–351
See application file for complete search history.

(56) References Cited

U.S. PATENT DOCUMENTS 3,665,512 A * 5/1972 Hall et al. .............. 342/13
3,701,153 A * 10/1972 Gagliardi et al. ........ 342/165
3,979,555 A * 9/1976 Opittek et al. .......... 342/176
4,166,980 A * 9/1979 Apostolos et al. ....... 375/316

(Continued)

FOREIGN PATENT DOCUMENTS

JP    07-020226    1/1995

(Continued)

OTHER PUBLICATIONS

Office action dated Nov. 18, 2008 in Japanese Application No. 2007-072894.

(Continued)

*Primary Examiner*—Bernarr E Gregory
(74) *Attorney, Agent, or Firm*—Harness, Dickey & Pierce, PLC

(57) ABSTRACT

A method for a radar for detecting a noise floor level of an electric signal corresponding to an incident radio wave received by the radar, the incident radio wave including a return of a radar wave that is transmitted from the radar toward a measuring range of the radar to detect target object characteristic including presence of a target object within the measuring range of the radar, a distance between the target object and the radar, and a relative speed of the target object to the radar is provided. The method includes steps of: calculating a histogram of intensities of frequency components, the frequency components exceeding a predetermined value relating to the measuring range, and extracting an intensity having the maximum height in the histogram as the noise floor level of the electric signal.

10 Claims, 12 Drawing Sheets

U.S. PATENT DOCUMENTS

| | | | | |
|---|---|---|---|---|
| 4,665,402 A * | 5/1987 | Young | ............................ | 342/91 |
| 4,694,468 A * | 9/1987 | Cullum | ........................ | 375/348 |
| 4,970,660 A * | 11/1990 | Marchant | ...................... | 342/90 |
| 4,972,193 A * | 11/1990 | Rice | ............................... | 342/90 |
| 5,337,055 A * | 8/1994 | Ghignoni | ...................... | 342/93 |
| 5,703,592 A * | 12/1997 | Watts | ............................ | 342/93 |
| 5,818,866 A * | 10/1998 | Wilk | ............................ | 375/346 |
| 5,881,096 A * | 3/1999 | Majkrzak et al. | ............. | 375/319 |
| 5,905,765 A * | 5/1999 | Snodgrass | .................... | 375/346 |
| 5,987,075 A * | 11/1999 | Abe et al. | .................... | 375/345 |
| 6,038,267 A * | 3/2000 | Oura et al. | ................... | 375/347 |
| 6,128,353 A * | 10/2000 | Ho et al. | ....................... | 375/345 |
| 6,131,013 A | 10/2000 | Bergstrom et al. | | |
| 6,549,755 B2 * | 4/2003 | Chu et al. | .................... | 375/345 |
| 6,717,545 B2 * | 4/2004 | Dizaji et al. | ................... | 342/93 |
| 6,724,836 B1 * | 4/2004 | Graf et al. | .................... | 375/279 |
| 6,771,701 B1 * | 8/2004 | Klindworth et al. | ......... | 375/350 |
| 6,825,799 B2 | 11/2004 | Isaji | | |
| 6,894,641 B2 | 5/2005 | Uehara et al. | | |
| 7,184,493 B1 * | 2/2007 | Pringle et al. | ............... | 375/316 |
| 7,187,321 B2 | 3/2007 | Watanabe et al. | | |
| 7,336,736 B2 * | 2/2008 | Leblond et al. | ............. | 375/316 |
| 7,447,277 B2 * | 11/2008 | Yajima et al. | ............... | 375/272 |
| 2003/0174088 A1 * | 9/2003 | Dizaji et al. | ................... | 342/93 |
| 2004/0258178 A1 * | 12/2004 | Leblond et al. | ............. | 375/316 |
| 2006/0181448 A1 | 8/2006 | Natsume et al. | | |
| 2006/0256892 A1 * | 11/2006 | Momtaz | ...................... | 375/317 |
| 2007/0058739 A1 * | 3/2007 | Aytur et al. | .................. | 375/345 |

FOREIGN PATENT DOCUMENTS

| | | |
|---|---|---|
| JP | 2002-502175 | 1/2002 |
| JP | 2002-168947 | 6/2002 |
| JP | 2002-286774 | 10/2002 |
| JP | 2004-163340 | 6/2004 |
| JP | 2004-170183 | 6/2004 |
| JP | 2004-264258 | 9/2004 |
| JP | 2006-220624 | 8/2006 |
| JP | 2006-242818 | 9/2006 |
| JP | 2006-300550 | 11/2006 |
| WO | 2006/120824 A1 | 11/2006 |

OTHER PUBLICATIONS

"Multiple Emitter Location and Signal Parameter Estimation" by R.O. Schmidt: IEEE Transactions on Antennas and Propagation, vol. AP-34, No. 3, Mar. 1986; pp. 276-280.

\* cited by examiner

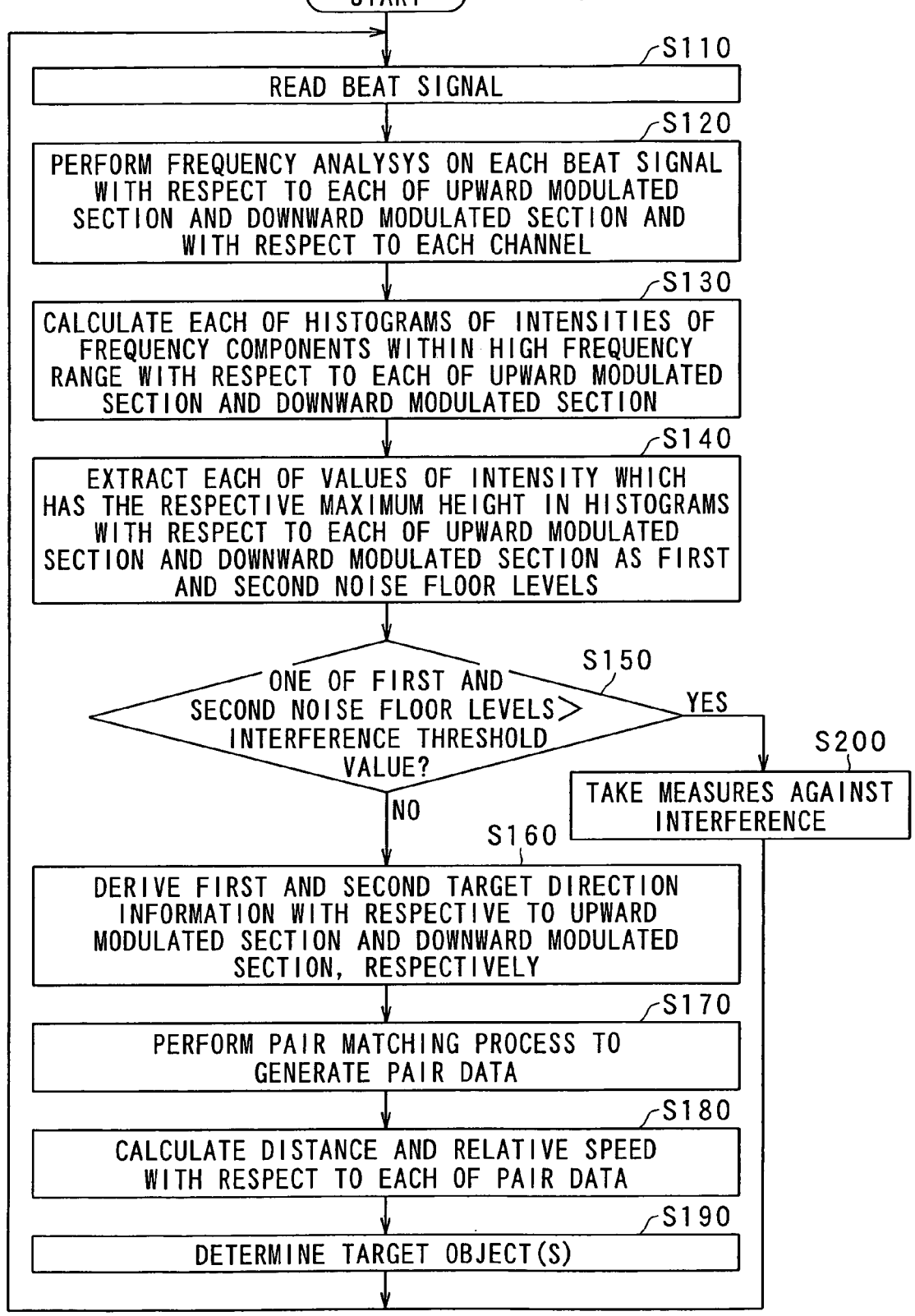

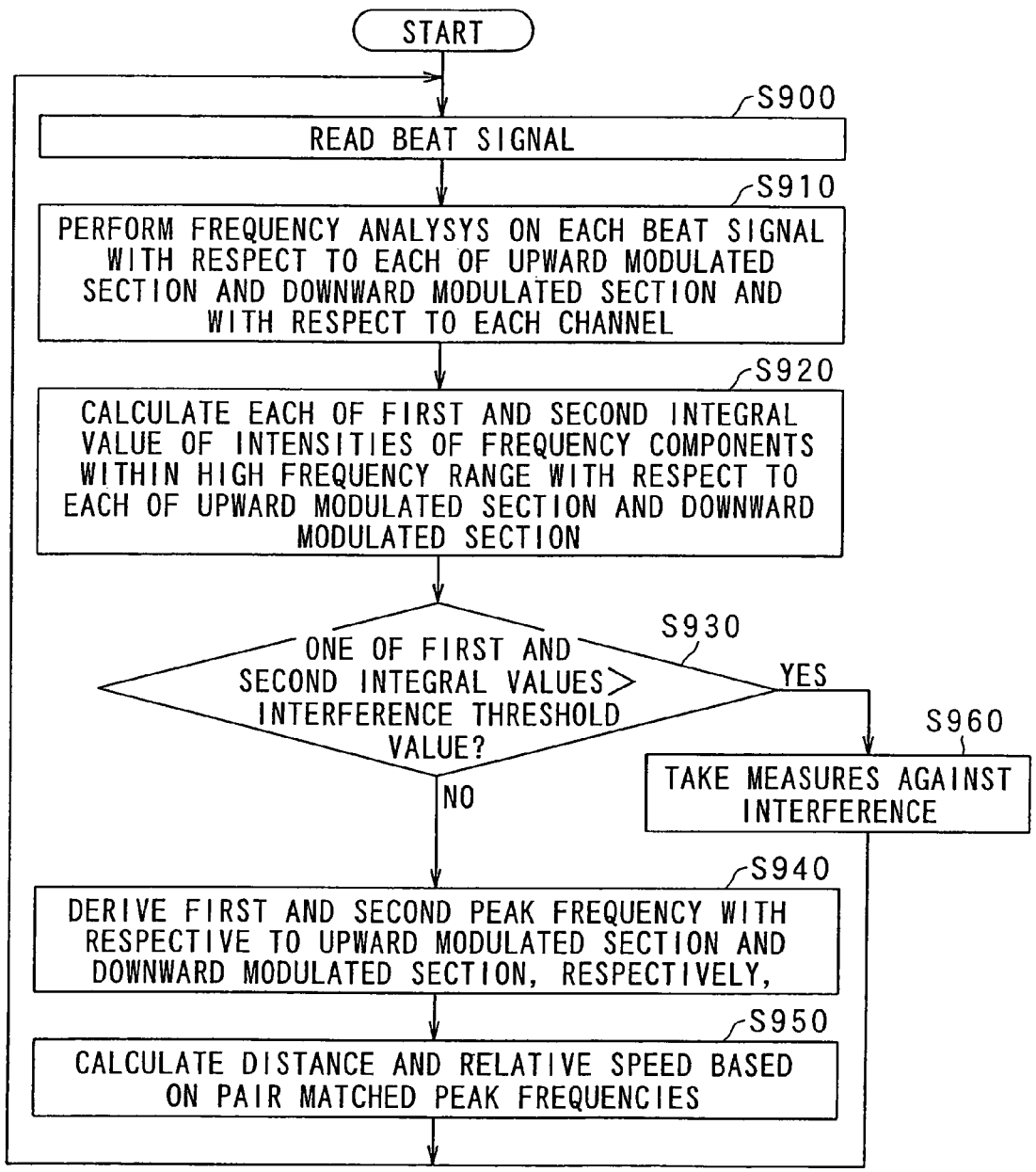

METHOD FOR DETERMINING NOISE FLOOR LEVEL AND RADAR USING THE SAME

CROSS REFERENCE TO RELATED APPLICATION

The present application relates to and incorporates by reference Japanese Patent Applications 2007-72894 filed on Mar. 20, 2007.

BACKGROUND OF THE INVENTION

1. The Field of the Invention

The present invention relates to a method for a radar for determining a noise floor level that is increased in response to interference by a radar wave transmitted from some other radar. The present invention further relates to an interference detecting device for a frequency modulated continuous wave (FMCW) radar and the FMCW radar equipped with interference detecting device using the method for estimating the noise floor level to accurately determine occurrence of interference between the FMCW radar and some other radar.

2. Description of the Prior Art

A number of automotive radar systems which are suited to vehicle safety system, for example, crash protection systems that minimize the effects of an accident, reversing warning systems that warn the driver that the vehicle is about to back into an object such as a child or another vehicle and the like, are known. Hence, it is important for these automotive radar systems to provide the driver with some information as to the nature or location of a target object. One target characteristic of great importance is the distance from the radar to the target object (the downrange distance). In particular, if there are multiple target objects, distances to those target objects are important information for the driver. Thus, it is obvious that radars that provide accurate downrange information for multiple target objects are desired.

The simplest automotive radar systems use a continuous wave (CW) radar in which a transmitter continuously transmits electromagnetic energy at a single frequency. The transmitted electromagnetic energy is reflected by a target object and received by the radar receiver. The received signal is shifted due to Doppler's effect by movement of the target object relative to the radar. The CW receiver filters out any returns without a Doppler shift, i.e., targets which are not moving with respect to the radar. When the receiver detects the presence of a Doppler shifted signal, the receiver sends a notification containing information about presence of the target object.

Another type of radar is a two-frequency CW radar. The two-frequency CW radar transmits electromagnetic energy at a first frequency and a second frequency. The transmitted energy is reflected by a target object and received by a two-frequency receiver. The receiver measures the difference between the phase of the signal received at the first frequency and the phase of the signal received at the second frequency. The distance to the target object can be calculated from the measured phase difference. Unfortunately, the two-frequency CW radar performs poorly when there are multiple target objects at different ranges, and thus the range measurement obtained from a two-frequency CW radar in the presence of multiple target objects unreliable.

There have been known FMCW radars used as vehicle-mounted radars to detect the presence of target object or obstacles, distance to a preceding vehicle, and relative speed of the preceding vehicle from the vehicle equipped with the FMCW radar.

In order to detect target characteristic such as presence of a preceding vehicle, downrange distance to the preceding vehicle, and relative speed of the preceding vehicle, the FMCW radar transmits a radar wave via a directional antenna unit. The frequency of the radar wave is modulated so as to linearly vary in time. After the target object reflects the radar wave, the reflected radar wave is received by the radar and transformed into a received signal to be subjected to signal processing for obtaining the target characteristic. The FMCW radar mixes the transmission signal and the received signal to produce a beat signal. The beat signal is subjected to a frequency analysis, for example, a fast Fourier transformation (FFT) and the like, to obtain the peak frequencies of the beat signal (beat frequencies) from which the distance to the target object and the relative speed between the FMCW radar and the target object can be determined. The frequency spectrum has peak intensities in the intensity versus frequency characteristic curves. The beat frequencies have the peak intensities.

During those operations, there is a possibility that the FMCW radar receives not only the reflected wave from the target object, but also a radar wave transmitted from some other radar installed in another vehicle, such as a vehicle running on the same or other side of the road (e.g., a preceding vehicle or an oncoming vehicle). That is, interference between the FMCW radar with which the subject vehicle is equipped and the other radar installed in the other vehicle may occur. As a result of interference, it is hard to detect the beat frequencies accurately, and the distance to the target object such as the preceding vehicle or the relative speed of the target object cannot be accurately detected.

One of the reasons for difficulties in detecting such target characteristic accurately is that frequency spectrum characteristic of the beat signal contains a broad peak. The broad peak in the frequency spectrum characteristic of the beat signal may be caused by interference which occurs in cases where the FMCW radar and the other radar have different modulation gradients of radar waves from each other (even if only slightly), or where the other radar is not FMCW type, for example, but two-frequency continuous wave, multi-frequency continuous wave, pulse, spread spectrum, and the like. The broad peak in the frequency spectrum characteristic may raise the noise floor level of the frequency spectrum characteristic of the beat signal so that the peak height of peak frequency of the beat signal (beat frequency) generated by mixing of the transmission signal and the received signal does hot exceed the noise floor level. In general, the noise floor level is the intensity of the noise from unidentified sources. As a result, the peak frequency cannot be detected accurately for the beat frequency. This results in an inaccurate detection of the target characteristic. That is, the distance to the target object or the relative speed of the target object may be erroneously determined.

In Japanese Published Patent Application No. 2006-220624 and the corresponding U.S. Patent Publication No. 2006/0181448, Natsume et al. discloses an FMCW radar which is capable of determining whether or not the FMCW radar is interfered with by some other radar.

The FMCW radar of Natsume et al. extracts high frequency components larger than a threshold frequency below which the beat frequency corresponding to the target characteristic of a target object located within the measuring rage of the FMCW radar should be positioned from the full frequency components of the beat signal. A high frequency range is defined as a frequency range containing frequency components exceeding the threshold frequency. Intensities of high frequency components of beat signal are used to calculate a reference value which is considered to relate to background noise or noise floor level. Then it is determined whether or not the FMCW radar is interfered with by some other radar based on the calculated reference value. In one of the embodiments of the FMCW radar of Natsume et al., the reference value is a sum (integral) of the intensities of the frequency components over the high frequency range. A determination whether or not interference between the FMCW radar and some other radar occurs is performed based on the sum of the intensities of the high frequency components. In another embodiment of the FMCW radar of Natsume et al., the reference value is a number of frequency components which satisfy predetermined conditions. The predetermined conditions are those that are beyond a predetermined frequency threshold and the intensities of the frequency components exceed a predetermined intensity threshold, wherein the predetermined frequency threshold is set to be out of a range within which the beat frequency corresponding to the target object located in the measuring range should be positioned, and the predetermined intensity threshold is set to be a sufficiently large value which cannot be obtained without occurrence of interference by some other radar. The predetermined frequency threshold can be set to twice the threshold frequency. It is judged whether or not interference between the FMCW radar and some other radar occurs based on the number of frequency components which satisfy the above-mentioned predetermined conditions.

The fundamental fact that is utilized by the conventional FMCW radars including that of Natsume et al. in detection of interference between the FMCW radar and some other radar is that an increase of the noise floor level of the frequency spectrum characteristic of the beat signal increases the sum of intensities of the high frequency components and increases the number of frequency components which satisfy the predetermined conditions. Using this fact, if the sum or the number exceeds corresponding threshold value, the conventional FMCW radars conclude that interference between the FMCW radar and some other radar is present.

However, the sum and the number just mentioned are increased by presence of some large or long object located far beyond the measuring region of the FMCW radar. Such a large or long object produces a beat signal having a higher beat frequency than that corresponding to the target object located in the measuring range. In particular, if there are more than a few target objects, a broad peak in the high frequency region of the frequency spectrum characteristic can appear, and may enhance the sum of intensities of the high frequency components or increase the number of the frequency components which satisfy the predetermined conditions beyond the corresponding threshold values. Hence, the conventional FMCW radars using the above mentioned fact may erroneously detect interference due to the existence of large or long target objects located far beyond the measuring region of the FMCW radar.

Further, if there are some large vehicles such as trucks and lorries, or large and long buildings such as a freeway bridge and its piers, the frequency spectrum characteristic of a beat signal may contain multiple high intensity peaks in the high frequency region.

Thus, large target objects located far beyond the measuring region of the FMCW radar enhance the sum of intensities of the high frequency components and increase the number of frequency components which satisfy the predetermined conditions even if there are no other radars near, and result in erroneous determination of occurrence of interference between the FMCW radar and some other radar. This means that it is necessary to establish a method for the FMCW radar for accurately detecting noise floor level in order to reliably detect the presence or absence of large target objects located far beyond the measuring region of the FMCW radar. Further, it is necessary to establish a method for FMCW radar for accurately determining whether interference between the FMCW radar and some other radar occurs even if some large or long target object such as trucks and lorries, or large and long buildings such as a freeway bridge and its piers exists beyond the measuring region of the FMCW radar.

The above-mentioned difficulties pose a problem: how the noise floor level should be estimated accurately based on incident wave to the receiving antennas of the radar.

In a prior method for a radar system that transmits a radar wave and receives the reflected radar wave by a target object to detect the target characteristic such as the downrange distance between the target object and the radar system for estimating noise floor level of a beat signal generated by mixing the radar wave and the reflected radar wave, a functional value of the maximum power spectrum of the beat signal has been recognized as noise floor level. Komori et al. disclose in WO 2006/120824 a method for determining the noise floor level as a function of the maximum power spectrum of the beat signal. In the method of Komori et al., if any spike noise is detected, the noise floor level of the frequency spectrum characteristic of the beat signal is determined based on the maximum absolute value of the spike noise. In this method, it is necessary to predetermine accurately the relationships between the maximum absolute value of the spike noise and the noise floor level of the frequency spectrum characteristic of the beat signal. This determination may be a difficult task if any interference between the radar and some other radar occurs.

In Japanese Published Patent Application No. 2004-163340 and the corresponding U.S. Patent Publication No. 2004/0095269, Uehara et al. disclose a vehicle-mounted radar system that detects reception of interference wave and estimates noise floor level. The radar system disclosed by Uehara et al. comprises a transmitting means for transmitting an electromagnetic wave and a receiving means for receiving the electromagnetic wave reflected by a target object. The radar system of Uehara et al. further comprises a signal processing means for measuring a distance between the radar system and the target object and a relative velocity on the basis of the transmitted electromagnetic wave and the received electromagnetic wave, and an interference detecting means for suspending a transmit operation of the transmitting means under a control of the signal processing means to detect an interference signal from an other external device. With this structure, because only noise signals such as interference wave entering the radar system are measured without measuring the reflected wave of any obstacles, the noise floor level can be calculated according to the definition of the noise floor level. However, it is necessary to suspend the transmit operation to estimate the noise floor level and to detect occurrence of interference. This means that during noise floor level estimation and interference detection, any target characteristic such as presence of a target object within the measuring range of the radar system, distance between the radar system and the target object, and relative velocity of the target object to the radar system can not be determined. This means that a continuous measurement of target characteristic can not performed.

Therefore, it is desired a radar that is capable of estimating noise floor level accurately, detecting occurrence of interference between the radar and some other radar reliably, and measuring target characteristic such as presence of a target object within the measuring range of the radar system, distance between the radar system and the target object, and relative velocity of the target object to the radar system accurately, even if some large or long target object such as trucks and lorries, or large and long buildings such as a freeway bridge and its piers exists beyond the measuring region of the radar, and even if there are multiple target objects within the measuring range of the radar.

SUMMARY OF THE INVENTION

The present invention has been made to solve the above-mentioned problems, and therefore an object of the present invention is to provide an FMCW radar, in particular a vehicle-mounted FMCW radar, and a method for accurately detecting noise floor level of the frequency spectrum characteristic of a beat signal which is obtained by mixing a transmission signal modulating a radar wave so as to linearly vary with time and a received signal relating to a reflected radar wave from a target object, based on a histogram illustrating distribution of the intensities of the frequency components of the beat signal, in order to accurately determine whether interference between the FMCW radar and some other radar occurs even if some large or long target object such as trucks and lorries, or large and long buildings such as a freeway and its piers is at place beyond the measuring region of the FMCW radar.

According to one aspect of the present invention, there is provided a method for a radar that detects target object characteristic including at least one of presence of a target object within a measuring distance range of the radar, a distance between the target object and the radar, and a relative speed of the target object to the radar for determining a noise floor level in analyzing an incident radio wave which is received and translated by a radar into an electric signal and which includes a return of a radar wave as having been transmitted by the radar and reflected from a target object within a measuring distance range of the radar.

The method according to this aspect of the present invention includes steps of: performing frequency analysis on the electric signal to derive a distribution of intensities of frequency components of the electric signal, calculating a histogram of the intensities of ones of the frequency components which are out of a given frequency range in which the return of the radar wave from the target object is to fall, and determining one of the intensities having a maximum height in the histogram of the intensities of the frequency components as the noise floor level.

According to another aspect of the present invention, there is provided a method for a frequency modulated continuous wave radar that transmits a frequency-modulated radar wave whose frequency changes in time, the radar wave having an upward modulated section during which the frequency of the radar wave increases in time and a downward modulated section during which the frequency of the radar wave decrease in time, for detecting a noise floor level of a beat signal including a first beat signal and a second beat signal which are generated by mixing the incident radio wave received by the radar and the radar wave transmitted from the radar in the upward modulated section and in the downward modulated section, respectively.

The method according to this aspect of the present invention includes steps of: executing frequency analysis, calculating a histogram of intensities of frequency components, and determining a noise floor level of the beat signal. In the step of executing frequency analysis, frequency analysis on the first and second beat signals which are generated by mixing the incident radio wave received by the radar and the radar wave transmitted from the radar in the upward modulated section and in the downward modulated section, respectively, to obtain a frequency spectrum characteristic that shows distribution of intensities of the first and second beat signals in a frequency domain is executed. In the step of calculating, a histogram of intensities of frequency components, the histogram of the intensities of the frequency components is calculated wherein the frequency components are defined as those that exceeds a maximum measurement frequency corresponding to a farthest distance of the measuring range, using the frequency spectrum characteristic of at least one of the first and second signals. In the step of detecting the noise floor level, a typical intensity having a maximum height in the histogram of the intensities of the frequency components of the beat signal is detected as the noise floor level.

According to another aspect of the present invention, there is provided a frequency modulated continuous wave (FMCW) radar that detects a target object characteristic including presence of a target object within a measuring range of the radar, a distance between the target object and the radar, and a relative speed of the target object to the radar.

The FMCW radar according to this aspect of the present invention includes a transmission signal generator, a transmission antenna, a reception antenna unit, a beat signal generator, a frequency analyzer, a histogram calculator, a noise floor level detector, a peak frequency detector, and a target object characteristic calculator. The transmission signal generator generates a transmission signal whose frequency is modulated so as to have a upward modulated section during which the frequency of the transmission signal increase in time and a downward modulated section during which the frequency of the transmission signal decrease in time. The transmission antenna transmits the transmission signal as a radar wave in the direction of the measuring range, the measuring range being limited to the farthest distance thereof which corresponds to a maximum measurement frequency. The reception antenna unit receives an incident radio wave including a return of the radar wave from the target object located within the measuring range of the radar so as to generate a received signal based on the incident radio wave. The beat signal generator generates first and second beat signals with respect to each of the upward modulated section and the downward modulated section, respectively, based on both the transmission signal and the received signal. The frequency analyzer executes frequency analysis on the first and second beat signals to obtain a first frequency spectrum characteristic and a second frequency spectrum characteristic which show distribution of intensities of the beat signal in the frequency domain with respect to the upward modulated section and the downward modulated section, respectively. The histogram calculator calculates a histogram of intensities of frequency components, which frequency components exceeding the maximum measurement frequency, based on at least one of the first and second frequency spectrum characteristic of the beat signal. The noise floor level detector detects a typical intensity that has a maximum height in the histogram of intensities of frequency components as the noise floor level. The peak frequency detector detects first and second peak frequencies which have respective highest intensities in the first and second frequency spectrum characteristic, respectively, if the first and second peak frequencies are below the maximum measurement frequency and have their intensities larger than a value determined as a function of the noise floor level. The target object characteristic calculator calculates the target object characteristic based on the first and second peak frequencies.

According to another aspect of the present invention, there is provided an interference detecting device for a frequency modulated continuous wave (FMCW) radar which device determines whether interference between the FMCW radar and some other radar occurs.

The interference detecting device according to this aspect of the present invention includes the transmission signal generator, the transmission antenna, the reception antenna unit, the beat signal generator, the frequency analyzer, the histogram calculator, the noise floor level detector, and an interference detector. The interference detector detects occurrence of interference between the FMCW radar and some other radar based on a result of whether or not the noise floor level exceeds a predetermined value.

BRIEF DESCRIPTION OF THE DRAWINGS

The present invention will be understood more fully from the detailed description to be given hereinbelow and from the accompanying drawings of the preferred embodiment of the invention, which is not taken to limit the invention to the specific embodiments but should be recognized for the purpose of explanation and understanding only.

In the drawings:

FIG. 5 is a flow chart showing a process for detecting the target object, the process including a step of detecting the noise floor level of the frequency spectrum characteristic of a beat signal based on a histogram of the intensities of the frequency components of the beat signal;

FIG. 9 is a flow chart showing a process for detecting the target object according to a comparative art;

DETAILED DESCRIPTION OF PREFERRED EMBODIMENTS

Figure 1:
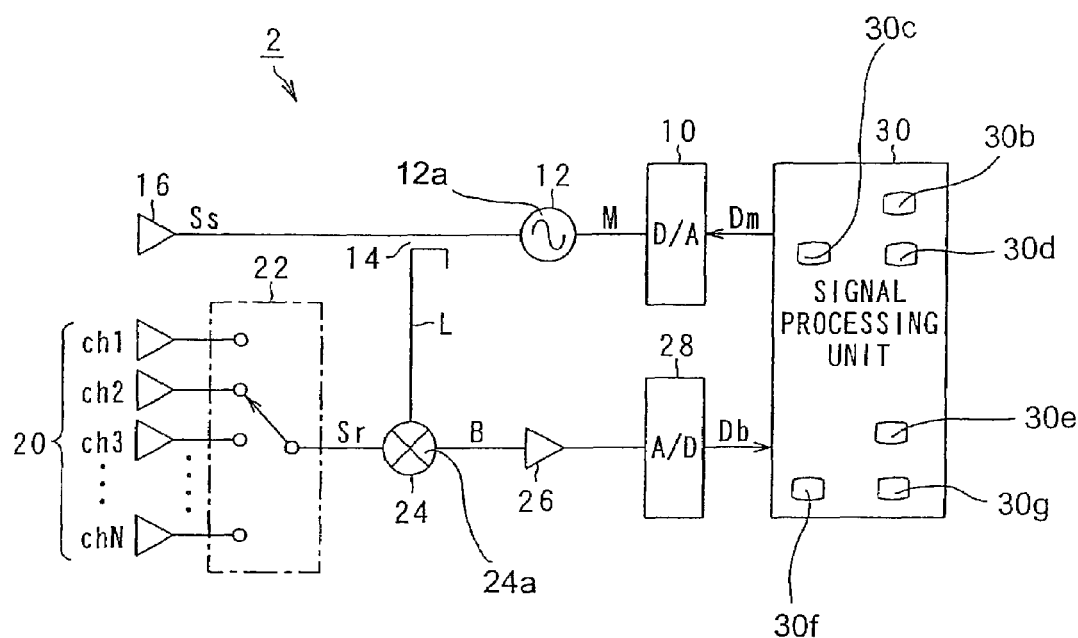
FIG. 1 is a block diagram showing an FMCW radar according to the present invention.

Preferred embodiments of the present invention will be explained below with reference to attached drawings. Identical constituents are denoted by the same reference numerals throughout the drawings.

FIG. 1 is a block diagram showing a vehicle-mounted FMCW radar according to the present invention. The FMCW radar detects the distance to a target object located in a measuring range and/or a relative speed of the target object such as a preceding vehicle.

As shown in FIG. 1, the FMCW radar 2 includes a digital-analog (D/A) converter 10, an oscillator 12 including a transmission signal generator 12a, a splitter 14, a transmitting antenna 16, and a signal processing unit 30. The signal processing unit 30 includes a frequency analyzer 30b, a histogram calculator 30c, a noise floor level detector 30d, a peak frequency detector 30e, a target object characteristic calculator 30f and an interference detector 30g.

The D/A converter 10 receives digital data Dm from the signal processing unit 30 and converts the received digital data Dm to an analog signal M. The oscillator 12 receives the analog signal M from the D/A converter 10 and thereby generates a radio frequency signal in the millimeter wave band, the frequency of the signal varying in time according to information contained in the analog signal M. The splitter 14 splits the electric power of the radio frequency signal generated by the oscillator 12 into a first portion relating to a transmission signal Ss, which is the radio frequency signal in the millimeter wave band, and a second portion relating to a local signal L that will be used to generate a beat signal. The transmitting antenna 16 radiates the transmission signal Ss as a radar wave toward a measuring range where a target object may be located.

The analog signal M is modulated by the D/A converter 10 to be formed in a triangular waveform having a period of $2 \times \Delta T$ where $\Delta T$ is called the sweep time. The frequency of the radio frequency signal generated by the oscillator 12 is modulated so as to increase linearly with the sweep time $\Delta T$, and then be linearly decreased within the sweep time $\Delta T$, according to the analog signal M. So the time dependence of the frequency of the transmission signal Ss has the same form with that of the local signal L. In the following, the time period during which the frequency of the radio frequency signal is linearly increased is called the upward modulated section or upsweeping modulation section, and the time period during which the frequency of the radio frequency signal is linearly decreased is called the downward modulated section or downsweeping modulation section.

The FMCW radar 2 further includes a receiving antenna unit 20, an antenna switch 22, a mixer 24 including a beat signal generator 24a, an amplifier 26, and an analog-digital (A/D) converter 28.

The receiving antenna unit 20 is constructed of N receiving antennas that receives a reflected radar wave reflected by the target object located in the measuring range. It is preferable that the N receiving antennas are arranged are aligned in a line and evenly spaced. This arrangement will be useful to detect the direction of the target object. Each of the receiving antennas connects to the corresponding receiving channel of the receiving switch 22. The antenna switch 22 selects one of the N receiving antennas constituting the receiving antenna unit 20, and supplies a received signal Sr from the selected receiving antenna to the downstream stage. The antenna switch 22 is connected to the signal processing unit 30. The signal processing unit 30 controls the timing of change for selecting the working antenna among the N receiving antennas of the receiving antenna unit 20. The mixer 24 mixes the received signal Sr supplied from the antenna switch 22 and the local signal L inputted from the splitter 14 to produce a beat signal B. The amplifier 26 amplifies the beat signal produced by the mixer 24 based on the received signal Sr and the local signal L. The amplified beat signal generated by the amplifier 26 is inputted into the A/D converter 28 to convert into digital data Db using a technique for digitizing the amplified beat signal, for example, by sampling the magnitude of the amplified beat signal at a predetermined sampling frequency. In order to generate a sampled signal with a sampling period corresponding to the predetermined sampling frequency, the A/D converter 28 further comprises a timer which is synchronized with a clock of the signal processing unit 30. The signal processing unit 30 receives the digital data Db from the A/D converter 28 and performs signal processing on the digital data Db to obtain information about the target characteristic such as the downrange distance to the target object that reflects the radar wave and the relative speed between the subject vehicle equipped with the FMCW radar 12 and the target object.

The signal processing unit 30 is mainly composed of a central processing unit (CPU), a memory such as a read only memory (ROM) and a random access memory (RAM), and a digital signal processor which is configured to execute a fast Fourier transformation (FFT) in signal processing of the digital data Db. The signal processing unit 30 further includes a clock that controls operation speed of the CPU and the digital signal processor and is used to measure time. The signal processing unit 30 connects to the antenna switch 22 and the A/D converter 28 to control the timing of change for selecting the working antenna and to convert the beat signal B to the digital data Db, respectively.

The N receiving antennas of the receiving antenna unit 20 are assigned to channel 1 (ch1) to channel N (chN), respectively. Let the sampling frequency per channel be fs, the predetermined sampling frequency of the A/D converter 28 should be $F_{samp} = N \times fs$.

The sampling frequency per channel fs is set as follows: if the maximum measurement frequency is defined as the frequency of a beat signal B corresponding to the farthest distance within the measuring range of the FMCW radar 2, the maximum measurement frequency limits a measuring frequency range such that frequencies below the maximum measurement frequency may be used to detect the distance to the target object that reflects the radar wave and the relative speed between the subject vehicle equipped with the FMCW radar 12 and the target object. Hence, the sampling frequency per channel fs is set to be twice the maximum measurement frequency or larger, preferably quadruple the maximum measurement frequency or larger. This means that the A/D converter 28 executes oversampling to extract redundant information from the beat signal B.

In the FMCW radar 2 constructed by the above-mentioned manner, the analog signal M is produced by the D/A converter 10 according to the digital data Dm from the signal processing unit 30. The frequency of the analog signal M varies in time.

Then, the oscillator 12 generates the radio frequency signal in the millimeter wave band. The frequency of the radio frequency signal varies with time in the same way as the frequency of the analog signal M varies. The radio frequency signal generated by the oscillator 12 is split by the splitter 14 to generate the transmission signal Ss and the local signal L. The antenna 16 radiates the transmission signal Ss as the radar wave toward the measuring range.

The radar wave radiated from the antenna 16 of the FMCW radar 2 is reflected by a target object such as a preceding vehicle or an oncoming vehicle located in the measuring range. The reflected radar wave coming back to the FMCW radar 2 is received by all N receiving antennas of the receiving antenna unit 20. However, the receiving antenna unit 20 receives electromagnetic wave that is transmitted from some other radar or is reflected by some obstacle located out of the measuring range of the FMCW radar 2. These electromagnetic waves which are not expected to detect the target object located in the measuring range are identified as noise signals.

The N receiving antennas are indexed by channel i (ch i) (i=1, 2, ..., N). The antenna switch 22 successively selects one of the N receiving antennas such that the channel selected by the antenna switch 22 is changed at a predetermined interval, and supplies the received signal Sr which is received by the antenna connecting to the selected channel of the receiving switch 22 to the mixer 24. It is preferable that the antenna switch 22 includes a timer to change the selected antenna at the predetermined interval. Further it is allowed that the antenna switch 22 connects to the signal processing unit 30 and receives timing signals to change channel. The mixer 24 mixes the received signal Sr supplied from the antenna switch 22 and the local signal L inputted from the splitter 14 to produce the beat signal B. The beat signal B is amplified by the amplifier 26, and then is inputted into the A/D converter 28 to convert into a digital data Db using a technique of digitizing the amplified beat signal. The signal processing unit 30 receives the digital data Db from the A/D converter 28 and performs signal processing on the digital data Db to obtain information about the target characteristic such as the downrange distance to the target object that reflects the radar wave and the relative speed between the subject vehicle equipped with the FMCW radar 12 and the target object.

Referring to FIGS. 2A to 2D, a method for detecting the target characteristic such as the distance to the target object that reflects the radar wave and the relative speed between the subject vehicle equipped with the FMCW radar 2' and the target object will be described.

Figure 2A:
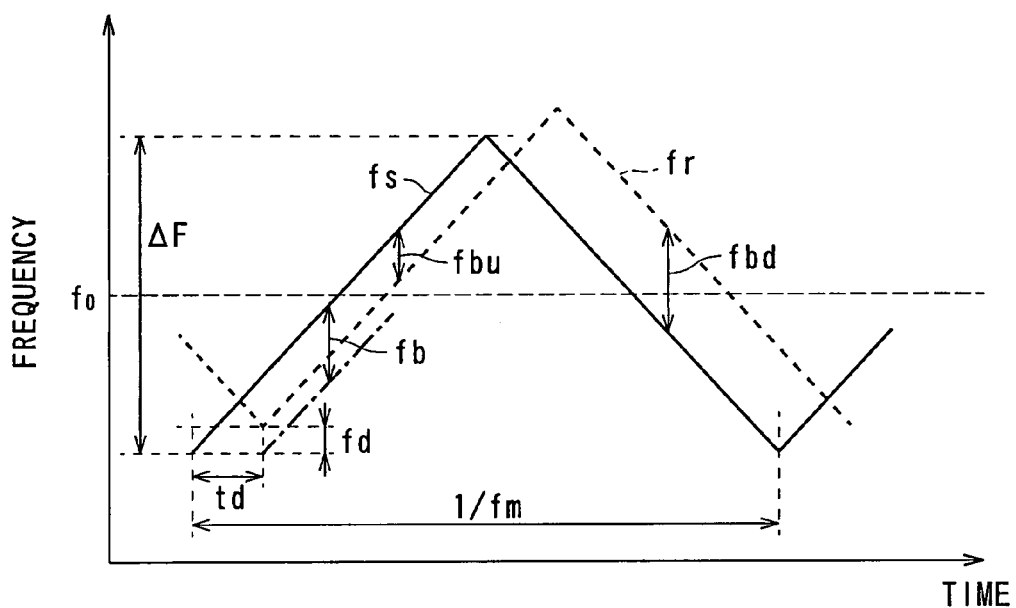
FIG. 2A is an explanatory graph showing frequency changes over time of a radar wave transmitted from the FMCW radar within an upward modulated section and a downward modulated section and of a reflected radar wave from a target object.

As shown in FIG. 2A, the frequency of the radar wave fs which corresponds to the transmission signal Ss and is transmitted from the antenna 16, varies periodically as a saw-toothed waveform. The saw-toothed waveform of the frequency variation of the radar wave fs has the upward modulated section or upsweeping modulation section during which the frequency of the radar wave fs is linearly increased by the frequency modulation width $\Delta F$ during the sweep time $\Delta T$ equal to half of the width of the frequency variation of the radar wave fs, $1/f_m$, and the downward modulated section or the downsweeping modulation section during which the frequency of the radar wave fs is linearly decreased by the frequency modulation width $\Delta F$ during the sweep time $\Delta T$ equal to the half of the period of the frequency variation of the radar wave fs, $1/f_m$. Hence, one period of the frequency variation of the radar wave fs of $2\times\Delta T$ consists of one upward modulated section and the following downward modulated section. The central frequency of the radar wave fs is f0, as shown in FIG. 2A, which is used to calculate the distance between the device 2 and the target object and the relative speed of the target object. The central frequency f0 of the radar wave fs can be adjusted. The radar wave fs radiated from the antenna 16 of the FMCW radar 2 is reflected by the target object located within the measuring range. Then, the target object serves as a source of a reflected radar wave fr, and the reflected radar wave fr is received by the receiving antenna unit 20 to generate the received signal Sr. Both the received signal Sr supplied from the antenna switch 22 and the local signal L inputted from the splitter 14 are mixed by the mixer 24 to produce a beat signal B. Here, the beat signal B includes a mixed signal generated by the local signal L and the received signal Sr within the upward modulated section and a further mixed signal generated by the local signal L and the received signal Sr within the downward modulated section.

For example, the antenna switch 22 is designed to execute the following operation: the antenna switch 22 sequentially changes the selected channel of the antenna unit 20 from channel 1 (ch1) to channel N (chN) each time a timing signal is received from the signal processing unit 30, and repeatedly selects them. Let the number of times of sampling per channel and per one period of the frequency variation of the radar wave fs including the upward modulated section and the downward modulated section, i.e., sweep time $2\times\Delta T = 2\times 1/f_m$, be $2\times M_{samp}$.

Thus, when a measurement equivalent to one of the upward modulated section and the downward modulated section is completed, $M_{samp}$ pieces of sampled data are produced with respect to each of the channels ch1 to chN.

Figure 2B:
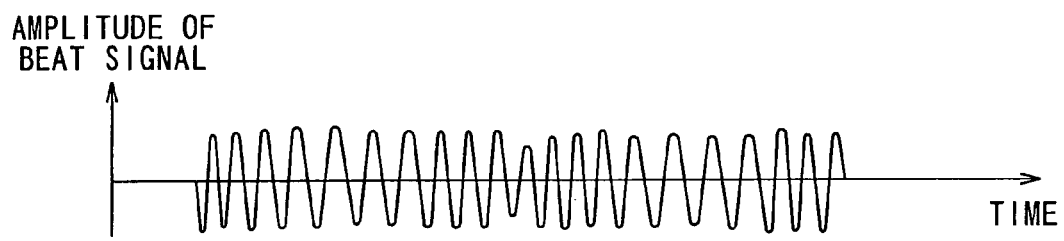
FIG. 2B is an explanatory graph showing the time dependence of the voltage amplitude of a beat signal generated by mixing the radar wave transmitted from the FMCW radar and the reflected radar wave from the target object.

FIG. 2B is an explanatory time chart showing the voltage amplitude of the beat signal generated by mixer 24. If no interference occurs and no large or long obstacles are located beyond the measuring range of the FMCW radar 2, and there are only target objects having zero relative speed to the radar 2 within the measuring range, the beat signal has a sinusoidal waveform having a constant frequency.

Figure 2C:
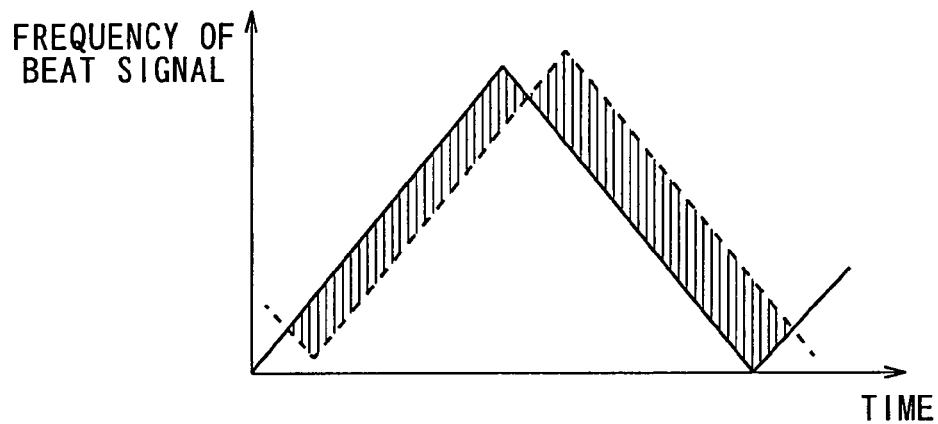
FIG. 2C is an explanatory graph showing a frequency change of the beat signal over time.

As shown in FIGS. 2A and 2C, in each of the upward modulated section and the downward modulated section, the A/D converter 28 samples the beat signal B recursively at a predetermined sampling period and converts the sampled beat signal B to the digital signal Db. Thus, the frequency variation of the reflected radar wave fr which includes a frequency increasing period and a frequency decreasing period is generated.

For example, in the case where the velocity of the vehicle-mounted FMCW radar 2 is equal to the velocity of the target object, that is, in the case where the relative speed of the target object is zero, the reflected radar wave is retarded by the time which it takes for the radar wave to travel between the radar 2 and the target object at the velocity of light c. In this case, the reflected radar wave from the target object fr is shifted in time by a retarded time td relative to the radar wave fs, as shown in FIG. 2A. Further, the beat signal B is analyzed by the Fourier analysis or other frequency analytical tool to obtain the power spectrum characteristic or other frequency spectrum characteristic of the beat signal B.

Figure 2D:
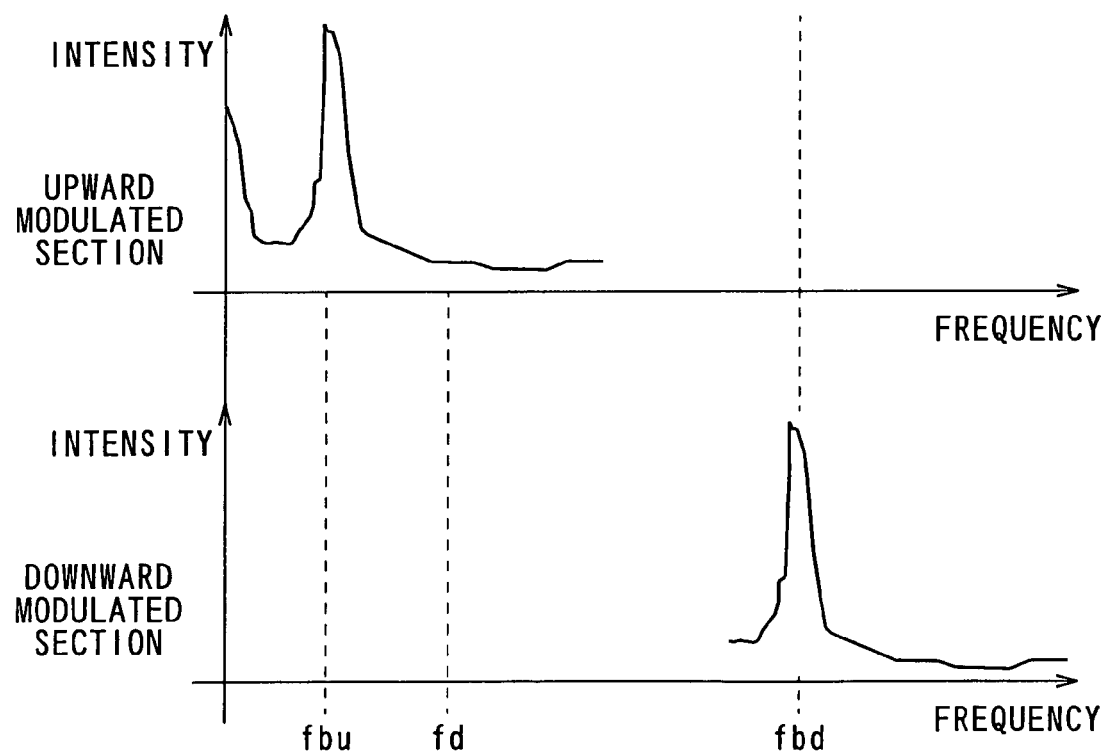
FIG. 2D is an explanatory diagram showing beat frequencies within the upward modulated section and the downward modulated section, the beat frequencies being used to determine the distance to the target object and the relative speed of the target object.

FIG. 2D is an explanatory diagram showing beat frequencies within the upward modulated section and the downward modulated section.

In the currently considered case where the relative speed of the target object is zero, the peak frequency fbu of the beat signal in the frequency increasing period is equal to the peak frequency fbd of the beat signal in the frequency decreasing period Let a distance between the radar 2 and the target object be D, the distance D is easily obtained by multiplying the velocity of light c by the retarded time td as: D=td×c.

However, in the case where the velocity of the vehicle-mounted FMCW radar 2 is different from the velocity of the target object, that is, in the case where the relative speed of the target object is not zero, the reflected radar wave has Doppler shift fd. Hence, the frequency of the reflected radar wave fr is shifted in frequency by the Doppler shift fd as well as in time by the retarded time td. In this case, as shown in FIG. 2D, the peak frequency fbu of the beat signal in the frequency increasing period is different from the peak frequency fbd of the beat signal in the frequency decreasing period. That is, the frequency of the reflected radar wave fr is shifted in time by the retarded time td as well as in frequency by the Doppler shift fd. Let the relative speed of the target object be V, the relative speed of the target object V can be calculated from the frequency difference between the radar wave fs and the reflected radar wave fr in the frequency axis in FIG. 2A.

The retarded time td of the reflected radar wave fr from the radar wave fs corresponds to a first component fb of the frequency shift of the reflected radar wave fr from the radar wave fr such that:

$$fb = \frac{|fbu| + |fbd|}{2}, \quad (1)$$

where fbu and fbd are the peak frequency of the beat signal in the frequency increasing period and the peak frequency of the beat signal in the frequency decreasing period, respectively. Because, the first component fb in equation (1) is obtained by removing the effect due to the Doppler shift, the first component fb of the frequency shift corresponds to the distance D between the apparatus 2 and the target object, as in the following:

$$D = \frac{c}{4 \times \Delta F \times f_m} \times fb, \quad (2)$$

where $\Delta F$ is the frequency modulation width during half of the period of the frequency variation of the radar wave fs, $1/f_m$, c is the velocity of light.

The Doppler shift fd relating to the relative speed V of the target object can be expressed using the peak frequency fbu of the beat signal in the frequency increasing period and the peak frequency fbd of the beat signal in the frequency decreasing period, as follows:

$$fd = \frac{|fbd| - |fbu|}{2}. \quad (3)$$

The relative speed V of the target object can be obtained from the peak frequencies fbu and fbd, using the following expression:

$$V = \frac{c}{2 \times f0} \times fd, \quad (4)$$

where f0 is the central frequency of the radar wave fs.

Hence, using the peak frequency fbu of the beat signal in the frequency increasing period and the peak frequency fbd of the beat signal in the frequency decreasing section, it is possible to obtain the distance between the FMCW radar 2 and the target object and the relative speed of the target object to the FMCW radar 2. Therefore, the determination of the peak frequencies fbu and fbd in the beat signal B is one of the important subjects in the frequency analysis. In order to determine the peak frequencies fbu and fbd accurately, separation of noise components in the frequency spectrum characteristic of the beat signal which directly relate to neither the distance between the target object and the radar 2 nor the relative speed of the target object is important. The noise components in the frequency spectrum characteristic of the beat signal may be generated due to interference which occurs in cases where the FMCW radar with which the subject vehicle is equipped and the other radar installed in another, interfering vehicle has different modulation gradients of radar waves from each other even if only slightly, or where the other radar is not of FMCW. Those noise components in the frequency spectrum characteristic of the beat signal lead to raise the noise floor level so that the heights at the peak frequencies fbu and fbd might not exceed the noise floor level. In general, the noise floor level is defined as the lowest threshold of useful signal level. Hence, the noise floor level is the intensity of the weak noise whose source is not specified, and affected by interference between the FMCW radar and some other radar, if interference occurs. Further, conventional tools for determining whether interference is present between the FMCW radar and some other radar gives an erroneous conclusion due to the existence of large target objects located far beyond the measuring region. Thus, it is important to detect large target objects located far beyond the measuring region of the FMCW radar 2.

Referring to FIGS. 3A to 4C, more detailed explanations for how the noise floor level increases in several situations such as where the FMCW radar with which the subject vehicle is equipped and the other radar installed in the other (interfering) vehicle has different modulation gradients of radar waves from each other even if the only slightly, and where the other radar is not of FMCW, for example, two-frequency continuous wave, multi-frequency continuous wave, pulse, spread spectrum, and the like will be explained.

Figure 3A:
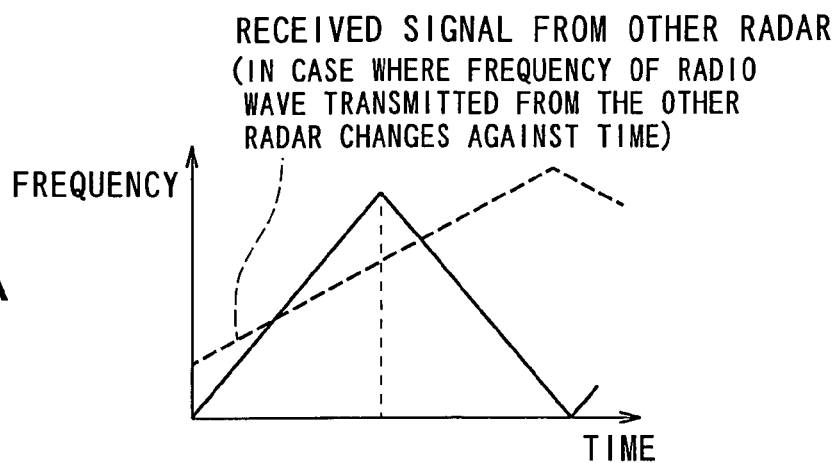
FIG. 3A is an explanatory diagram showing frequency changes of the radar wave transmitted from the FMCW radar and of the received radar wave transmitted from some other radar against time, when the frequency spectrum characteristic of the beat signal is affected by interference from some other radar transmitting a radar wave having a different modulation gradient from that of the radar wave transmitted from the FMCW radar.

FIG. 3A is an explanatory diagram showing changes in time of frequencies of radar wave transmitted from the FMCW radar 2 and of received radar wave transmitted from some other radar transmitting radar waves having a different modulation gradient from that of the radar wave transmitted from the FMCW radar. In this case, the range of the frequency variation of the radar wave fs within the upward modulated section and the downward modulated section overlaps with the range of the frequency variation of the radar waves transmitted simultaneously from the other radar in a time period.

Figure 3B:
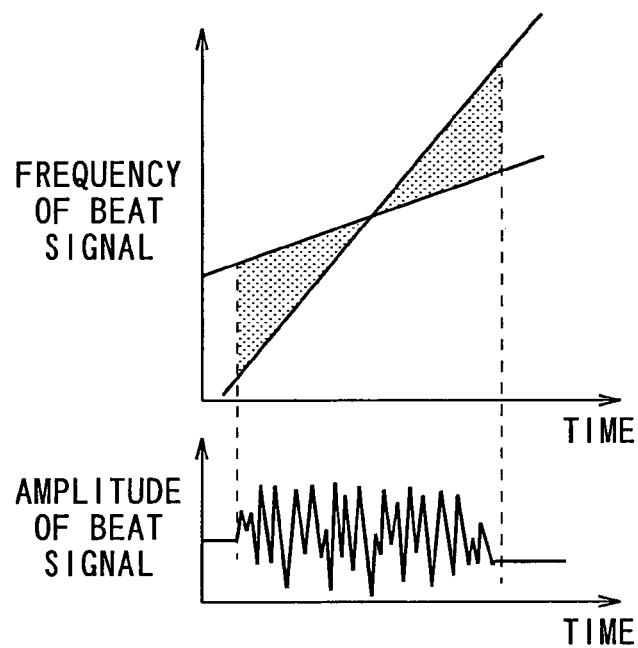
FIG. 3B is an explanatory diagram showing changes of frequency of the beat signal and of amplitude of voltage of the beat signal over time when the frequency spectrum characteristic of the beat signal are affected by existence of some other radar transmitting the radar wave having a different modulation gradient from that of the radar wave transmitted from the FMCW radar.

FIG. 3B is an explanatory diagram showing changes of frequency of the beat signal B and of amplitude of voltage of the beat signal B over time. As shown in FIG. 3B, within the upward modulated section, the frequency difference between the local signal L0 and a received radar wave including the radar wave transmitted from the other radar is variable and varies greatly in contrast to the case shown in FIG. 2A. The beat signal is generated by mixing the local signal L0 and the received signal Sr.

If the other radar transmits radar waves having the same frequency variation pattern with the radar wave transmitted from the FMCW radar 2, that is, if the frequency of the radar wave transmitted from the other radar increases within the upward modulated section of the radar wave and decreases within the downward modulated section, a narrow peak appears in the frequency spectrum characteristic in the beat signal.

However, if the frequency gradient of the radar wave transmitted by the other radar is different from that of the radar wave transmitted from the FMCW radar 2, a broad peak will be caused in the frequency spectrum characteristic of the beat signal because the difference between the frequencies of the radar waves transmitted from the other radar and the FMCW radar 2 varies in time so that many components of the frequency spectrum are included in the frequency spectrum characteristic of the beat signal.

Figure 3C:
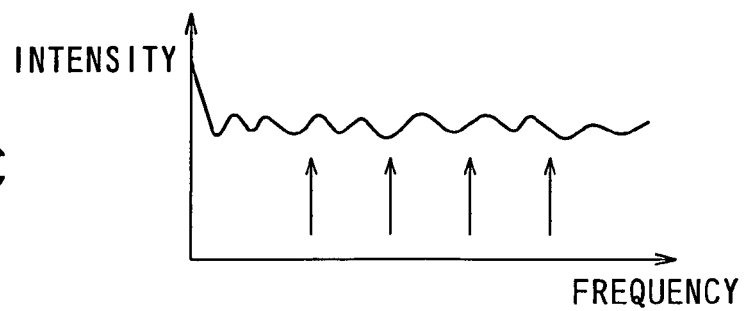
FIG. 3C is an explanatory diagram showing electric power spectrum characteristic of the beat signal when the frequency spectrum characteristic of the beat signal is affected by existence of some other radar transmitting the radar wave having a different modulation gradient from that of the radar wave transmitted from the FMCW radar.

FIG. 3C is an explanatory diagram showing the electric power spectrum characteristic of the beat signal in this case. It can be seen that the noise floor level is increased by the interference between the FMCW radar 2 and the other radar that transmits the radar wave having the different modulation gradient from that of the radar wave transmitted from the FMCW radar 2.

Figure 4A:
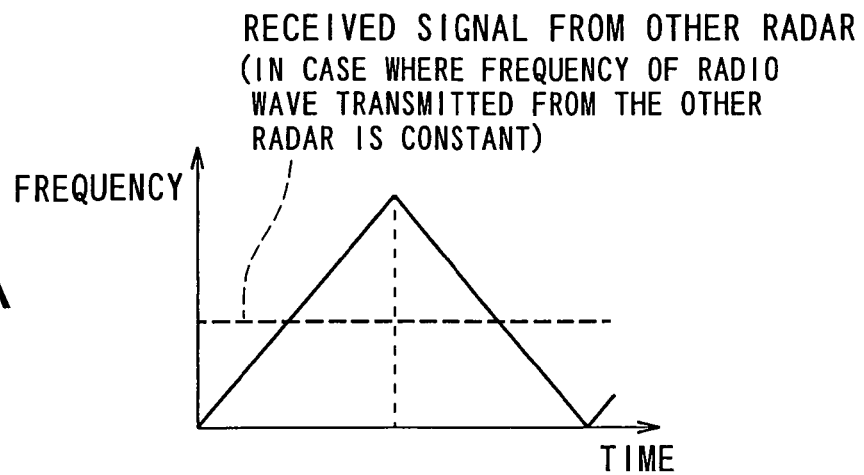
FIG. 4A is an explanatory diagram showing the change over time in frequencies of radar wave transmitted from the FMCW radar and a constant frequency of received radar wave transmitted from some other radar when the frequency spectrum characteristic of the beat signal is affected by some other radar transmitting a radar wave having a constant frequency over time.

FIG. 4A is an explanatory diagram showing the change over time in frequencies of radar wave transmitted from the FMCW radar 2 and a constant frequency of received radar wave transmitted from some other radar. The radars that transmit a radar wave having a constant frequency such as a two-frequency continuous wave type radar, a multi-frequency continuous wave type radar, a pulse type radar, and a spectrum spreading type radar.

Figure 4B:
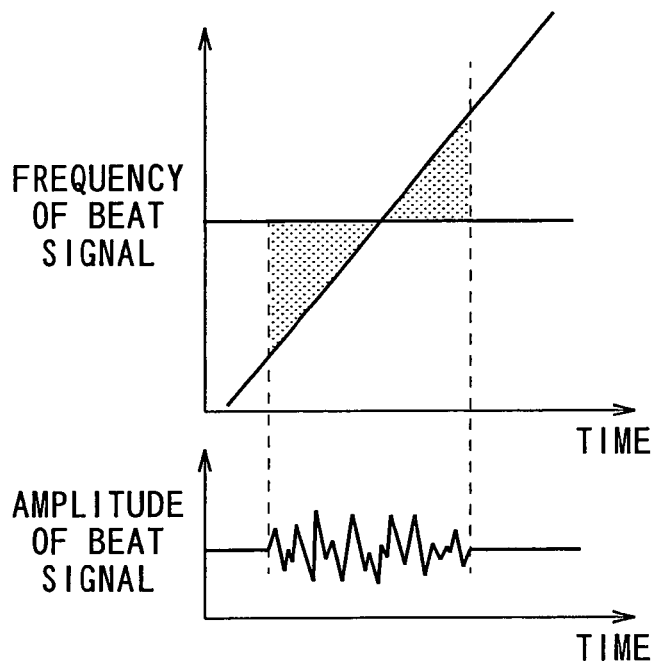
FIG. 4B is an explanatory diagram showing frequency changes of the beat signal and the voltage amplitude of the beat signal over time when the frequency spectrum characteristic of the beat signal are affected by some other radar transmitting with the constant frequency over time.

FIG. 4B is an explanatory diagram showing changes of frequency of the beat signal and of amplitude of voltage of the beat signal in time. In the case shown in FIG. 4B, within both the upward modulated section and the downward modulated section, the frequency difference between the local signal L0 and the received radar wave including the radar wave transmitted from the other radar is not constant and varies greatly in contrast to the case shown in FIG. 2A.

Figure 4C:
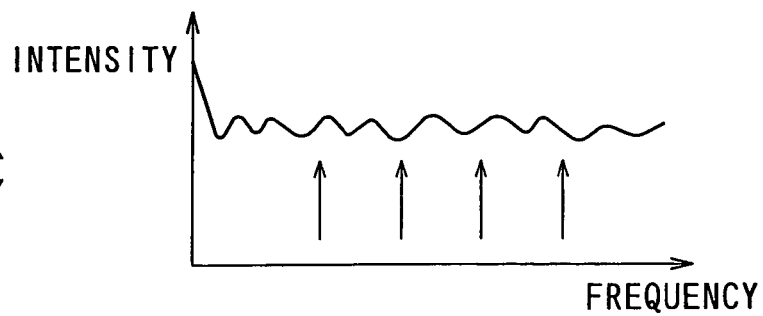
FIG. 4C is an explanatory diagram showing the electric power spectrum characteristic of the beat signal when the frequency spectrum characteristic of the beat signal is affected by some other radar transmitting the radar wave having the constant frequency over time.

In this case, as shown in FIG. 4C, the noise floor level is increased by the interference between the FMCW radar 2 and the other radar that transmits the radar wave having the different modulation gradient from that of the radar wave transmitted from the FMCW radar 2.

In both cases shown in FIGS. 3A and 4A, the beat signal includes frequency components from a low frequency to a high frequency, because the frequency difference between the local signal L0 and the received radar wave including the radar wave transmitted from the other radar is not constant and varies greatly. Therefore, when interference is caused between the radar waves transmitted from the FMCW radar 2 and the other radar, the frequency spectrum characteristic obtained by a frequency analysis may include a broad peak or enhanced noise floor level. If we define the maximum measurement frequency as a frequency below which the beat frequency corresponding to the target characteristic of the target object located within a measuring range of the FMCW radar, some frequency components of the broad peak are beyond the maximum measurement frequency.

The broad peak generated by interference by some other radar is detected by using one of known techniques utilizing the fact that a rise in the noise floor level of the frequency spectrum characteristic of the beat signal leads to an increase in the sum of intensities of the high frequency components or the count of frequency components which satisfy the predetermined conditions. Using this fact, if the sum or the count exceeds a corresponding threshold value, the conventional FMCW radars conclude that interference by some other radar occurs.

If some large vehicles such as trucks and lorries, or buildings such as a freeway bridge and its piers are at a place further than the measuring range of the FMCW radar 2, the frequency spectrum characteristic of a beat signal may contain multiple very large peaks in the high frequency region beyond the maximum measurement frequency. Thus, large target objects located far beyond the measuring region of the FMCW radar increase the sum of intensities of the high frequency components and the count of frequency components which satisfy the predetermined conditions without any other radar, and result in erroneous determinations of interference by some other radar when one of the known techniques is applied.

Hereinafter, referring to FIG. 5, a method for determining whether interference by some other radar occurs will be explained. The method to be explained below results in improving accuracy of determining whether interference by some other radar occurs.

FIG. 5 is a flow chart showing a method for determining whether interference by some other radar occurs. The method works well even if large target objects, for example, large vehicles such as trucks and lorries, or buildings such as a freeway bridge and its piers are at a place further than the measuring range of the FMCW radar 2. The method includes a step of detecting the noise floor level of the frequency spectrum characteristic of the beat signal based on a histogram of the intensities of the frequency components of the beat signal. The processes shown in FIG. 5 are carried out by the signal processing unit 30 in FIG. 1. This procedure starts and then repeats with a predetermined interval.

At step S110, the signal processing unit 30 of the FMCW radar 2 outputs digital data Dm to the D/A converter 10. The digital data Dm includes information about frequency modulation of the radio frequency signal in the millimeter wave band to generate the radar wave over one period of the frequency variation. One period of the frequency variation consists of the upward modulated section and the downward modulated section. In the upward modulated section, the frequency of the radar wave fs is linearly increased by the frequency modulation width $\Delta F$ during the sweep time $\Delta T$. In the downward modulated section, the frequency of the radar wave fs is linearly decreased by the frequency modulation width $\Delta F$ during the sweep time $\Delta T$. The information for modulating the radio frequency signal is used by the oscillator 12 to generate the radar wave to be radiated from the antenna 16. Moreover, at step S110, the signal processing unit 30 reads digital data Db obtained by the A/D converter 28. The digital data Db is obtained by converting the beat signal generated by the mixer 24. The beat signal is generated by mixing the received signal Sr, i.e., the reflected radar wave received by the receiving antenna unit 20, and the local signal L that includes information about the digital data Dm.

In this embodiment, the digital data Db of the beat signal B consists of first digital data including intensity of the beat signal in the frequency increasing section and second digital data including intensity of the beat signal in the frequency decreasing section. The digital data Db of the beat signal B is stored in the memory of the signal processing unit 30. Each of the first and second digital data has $N \times M_{samp}$ pieces of sampled data. Thus, the A/D converter 28 executes oversampling to extract redundant information from the beat signal.

Subsequently at step S120, the signal processing unit 30 executes the frequency analysis, for example the fast Fourier transformation (FFT) analysis, for the first and second digital data of the beat signal corresponding to data in the frequency increasing section and in the frequency decreasing section, respectively. As a result of the fast Fourier transformation, complex values, each value being assigned to the one of the frequency components, are calculated. That is, a time domain representation of intensity of the beat signal is transformed to a frequency domain representation thereof by means of the Fourier transformation. The absolute value of each of complex values indicates the power of the corresponding frequency component. Thus, by means of the Fourier transformation, the power spectrum of the beat signal or the frequency spectrum characteristic can be obtained.

It is allowed that the first and second frequency spectrum characteristic of the beat signal corresponding to the first and second digital data, respectively, would be separately calculated. Further, it is allowed that each frequency spectrum characteristic of the beat signal with respect to each channel and each of the frequency increasing section and in the frequency decreasing section would be calculated based on each $M_{samp}$ pieces of sampled data. In this case, 2 spectrum characteristic of the beat signal B are obtained.

It is noted that if the maximum measurement frequency is defined as a frequency of a beat signal B which indicates the farthest distance within the measuring range of the FMCW radar 2, the maximum measurement frequency limits a measuring frequency range such that frequencies below the maximum measurement frequency are allowed to detect the distance to the target object that reflects the radar wave and the relative speed between the subject vehicle equipped with the FMCW radar 12 and the target object. Thus, high frequency components can be defined as those beyond the maximum measurement frequency. The frequency range covering the high frequency components will be referred as to the high frequency range.

At step S130, using the power spectrums of the beat signal obtained at step S120, especially using the power spectrum data corresponding to the frequency components within the high frequency range, histograms of the intensities of those frequency components of the beat signal with respect to each of the upward modulated section and the downward modulated section are obtained. The histogram shows how frequently a given intensity or power is counted in the frequency components of the frequency spectrum characteristic of the beat signal in the high frequency range. In other words, the histogram shows the distribution of the intensity or power of the beat signal with respect to the frequency components within the high frequency range. In this embodiment, the histograms are obtained based on the intensity of the frequency components within the high frequency range in the power spectrum of the first and second beat signals. However, it is allowed that only one histogram the intensities of those frequency components of the beat signal would be calculated by using both first and second frequency spectrum characteristic of the beat signal.

Further, it is allowable that the histograms with respect to every channel and with respect to the upward modulated section and the downward modulated section are calculated. In this case, each histogram is obtained based on the $M_{samp}$ pieces of sampled data.

If the maximum measurement frequency is set to 116 kilohertz which corresponds to 256 meters when the relative speed of the target object is zero, the high frequency range can be set to be 200 to 333 kilohertz.

Then, at step S140, the signal processing unit 30 extracts value of the intensity or power of the beat signal in the upward modulated section from the intensities of those frequency components of the beat signal such that the value has the maximum height in the histogram. The same procedure is performed with respective to the downward modulated section. The extracted values defines corresponding noise floor levels, i.e., the first noise floor level obtained based on the first digital data corresponding to the upward modulated section and the second noise floor level obtained based on the second digital data corresponding to the downward modulated section. The values of the intensity or power of the beat signal which have the respective maximum height in the histograms are referred as to peak powers. In other words, the first noise floor level is the most frequently found intensity in the histogram of the intensities of the frequency components of the beat signal within the high frequency range with respect to the upward modulated section. The second noise floor level is the most frequently found intensity in the histogram of the intensities of the frequency components of the beat signal within the high frequency range with respect to the downward modulated section.

In this embodiment, the histograms with respect to the upward modulated section and the downward modulated section are obtained based on all $N \times M_{samp}$ pieces of sampled data of the first and second digital data, respectively. However, it is allowable that only one of the histograms with respect to at least one of the upward modulated section and the downward modulated section is obtained based only on digital data according to the beat signal that is generated by the received signal Sr including all of channels of the receiving antenna unit 20. In this case, only one value of intensity or power of the beat signal which has the maximum height in the histogram can be selected as a floor noise level.

If a plurality of values of the intensity or power of the beat signal which give the same maximum height in the histogram at the step S130, it is allowed either to recognize the lowest or the highest intensity which give the maximum height as the noise floor level or to calculate a value as a function of the values of the intensity or power of the beat signal which give the same maximum height as the noise floor level.

If only one noise floor level was obtained in the step S140, it is judged whether or not the noise floor level exceeds a predetermined interference threshold value.

In this embodiment, the noise floor level obtained at step S140 is most frequently seen in the frequency spectrum characteristic of the beat signal within the high frequency range. Thus, the procedure for determining noise floor level includes no ambiguity. Therefore, it is possible to estimate the noise floor level accurately, even if some large or long target object such as trucks and lorries, or large and long buildings such as a freeway bridge and its piers exists beyond the measuring region of the FMCW radar, and even if there are multiple target objects within the measuring range of the radar.

Subsequently at step S150, it is determined whether or not at least one of the first and second noise floor levels exceeds a predetermined interference threshold value. This determination is carried out to judge whether or not some measures will be taken against the interference between the FMCW radar and some other radar.

If the determination at step S150 is "NO", that is, if both of the first and second noise floor levels do not exceed the predetermined interference threshold value, it is determined that neither interference between the FMCW radar and some other radar nor influence of existence of objects located far beyond the measuring region have occurred. Then the procedure proceeds to step S160.

At step S160, a peak-detecting threshold value is set to be larger than the predetermined interference threshold value, and frequency components which are below the maximum measurement frequency and whose power exceed the peak-detecting threshold value are separately collected as peak frequencies with respect to each of the upward modulated section and the downward modulated section and with respect to each channel. Then, the digital data $x_i(t)$ (i=1, ..., N) corresponding to each of the peak frequencies with respect to corresponding channel are collected from the received signal Sr to form a vector $X(t)=(x_i(t), ..., x_N(t))$. It is preferable that each of the digital data $x_i(t)$ (i=1, ..., N) consists of data in 3 upward modulated sections or 3 downward modulated sections. This vector X(t) is utilized to obtain the direction of the target object located within the measuring range of the FMCW radar 2. For example, the multiple signal classification (MUSIC) method can be applied to obtain the direction of the target object, if the N antennas of the receiving antenna unit 20 are equally separated. In the MUSIC method, a self-correlation matrix of X(t) plays a central role to estimate the direction of the target object. A description of the MUSIC method can be found in "Multiple emitter location and signal parameter estimation" by R. O. Schmidt, IEEE Trans. Antennas Propagat. Vol. 34 (3) March (1986) pp. 276-280. Using the MUSIC method, the direction of the target object is detected based on the digital signal data $x_i(t)$ (i=1, . . . , N) corresponding to each of the peak frequencies with respect to each channel over one period of 2×ΔT in the saw-toothed waveform of the frequency variation of the radio frequency signal. If a plurality of peak frequencies is detected, it is expected that there are a plurality of target objects whose number is equal to that of the peak frequencies. Thus, the directions of the target objects are obtained with respect to each of the upward modulated section and the downward modulated section. Those data including the peak frequencies and the directions of the target objects with respect to the upward modulated section and the downward modulated section will hereinafter be referred as to a first target direction information and a second target direction information, respectively.

In the present embodiment, the peak frequencies are obtained based on all $N \times M_{samp}$ pieces of sampled data of each of the first and second digital data. In this embodiment, all $N \times M_{samp}$ pieces of sampled data are averaged over N channels, then $M_{samp}$ pieces of sampled data of each of the first and second digital data are used to obtain the peak frequencies.

Further, it is allowed to estimate the peak frequencies based on down-converted data obtained by subsampling the full $N \times M_{samp}$ pieces of sampled data of the first and second digital data. Then the procedure proceeds to step S170.

At step S170, a pair matching process in which the first target direction information and the second target direction information are compared is executed. One of alms of performing the pair matching process is to extract multiple target objects. As a result of the pair matching process, pair data comprising a value from the first target direction information and the corresponding value from the second target direction information are provided.

In general, both in the first and second digital data corresponding to the upward and downward modulated sections, respectively, include multiple intensity peaks, each intensity peak corresponding to beat frequencies, in the measuring frequency range. Each of those intensity peaks can be considered to indicate the presence of a target object. However, it is need to establish a pair of peak frequencies, one being extracted from the first digital data and another being extracted from the second digital data, to calculate the target object characteristic. If M intensity peaks are included in each of the first and second digital data, M×M pairs of beat frequencies are possible. Thus, the pair data has at most M×M pairs of peak frequencies.

At step S180, the pair data are utilized to give distance of one of candidates target objects and relative speed of the candidates target objects.

If M intensity peaks are included in each of the first and second digital data, at most M×M distances to candidate target objects and M×M relative speeds of the candidate target objects are calculated. It can be considered that among M×M candidate target objects, (M−1)×M candidate target objects are artefacts which can not present in the real world. The artefacts would be identified at next step S190.

It is allowed that previously obtained direction information may have been stored in the memory of the signal processing unit 30 and can be referred to perform the pair matching process in which one of the peak frequencies in the first target direction information and the corresponding peak frequency in the second target direction information should be associated to identify one of the target objects. That is, it is preferable that the current first target direction information and the current second target direction information are stored in the memory of the signal processing unit 30 to be used in next time. Instead of the current first target direction information and the current second target direction information, all digital data $x_i(t)$ (i=1, . . . , N) corresponding to the peak frequencies with respect to all N channels and with respect to the upward modulated section and the downward modulated section can be stored. Further, it is allowed that the power spectrum of the beat signal obtained at step S120 are stored in the memory.

Then, at step S190, the distances of the target objects and the relative speeds of the target objects are determined based on the pair data calculated at step S180.

For example, all candidates for distances of the candidate target objects and relative speeds of the candidate target objects are examined in terms of consistency of the target objects' motions. That is, if some consistent physical tracks of candidates for the target objects can be traced, the candidates would be judged to be real target objects. In this case, it is necessary to refer target object characteristic including distance to the target objects and relative speed of the target objects at a time when the FMCW radar 2 has performed the detecting procedure defined by steps S110-S200 in FIG. 5.

Further, it is allowed that balances of intensities of peak frequencies which constituted of one of the pairs of the peak frequencies can be examined. A large imbalance in the intensities of the peak frequencies suggests that two peak frequencies are generated by different target objects.

Further, it is allowed that all candidates for distances of the candidate target objects and relative speeds of the candidate target objects are examined in terms of consistency with the first and second directional data obtained at step S160.

The determined distances of the target objects and the relative speeds of the target objects can be used for an auto-cruise operation, for a vehicle-navigating operation, or for controlling safety system installed in the vehicle.

Further, at step S190, the determined distances of the target objects and the relative speeds of the target objects are memorized in the memory of the signal processing unit 30 to be referred in the next detecting procedure.

If the determination at step S150 is "YES", that is, at least one of the first and second noise floor levels exceeds a predetermined interference threshold value, it is determined that some interference by some other radar is present. Then, the procedure proceeds to step S200.

At step S200, some measures are taken against the interference between the FMCW radar and some other radar.

For example, if target object detection is impossible, an alarm is given to a driver of the vehicle equipped with the FMCW radar 2. Some other measure will be taken against the interference between the FMCW radar and some other radar via a display indication or a sound alarm.

Operations and Advantages of the Present Embodiment

Therefore, the radar 2 is capable of estimating noise floor level accurately, detecting occurrence of interference between the radar and some other radar reliably, and measuring target characteristic such as presence of a target object within the measuring range of the radar system, distance between the radar system and the target object, and relative velocity of the target object to the radar system accurately, even if some large or long target object such as trucks and lorries, or large and long buildings such as a freeway bridge and its piers exists beyond the measuring region of the radar 2, and even if there are multiple target objects within the measuring range of the radar.

In the above embodiment, a method for estimating the noise floor level is disclosed in context of the FMCW radar 2. It is clear that other type of radars can perform the method for estimating the noise floor level according to the present invention.

The method for estimating the noise floor level according to the present invention can be suited to an interference detecting device that detects interference between a radar equipped with the interference detecting device and some other radar accurately. The radar that is suited to perform the above mentioned method for estimating the noise floor level is not limits to FMCW radars.

Further, the method for estimating the noise floor level according to the present invention can be utilized by a radar that detects the target object characteristic accurately due to an accurate estimation of the noise floor level of incident wave.

Referring to FIGS. 6A to 8B, the operation of the present embodiment will be explained.

As described above, the vehicle-mounted FMCW radar 2 determines occurrence of interference by some other radar based on the histogram of the intensity of frequency components of the beat signal B.

Figure 6A:
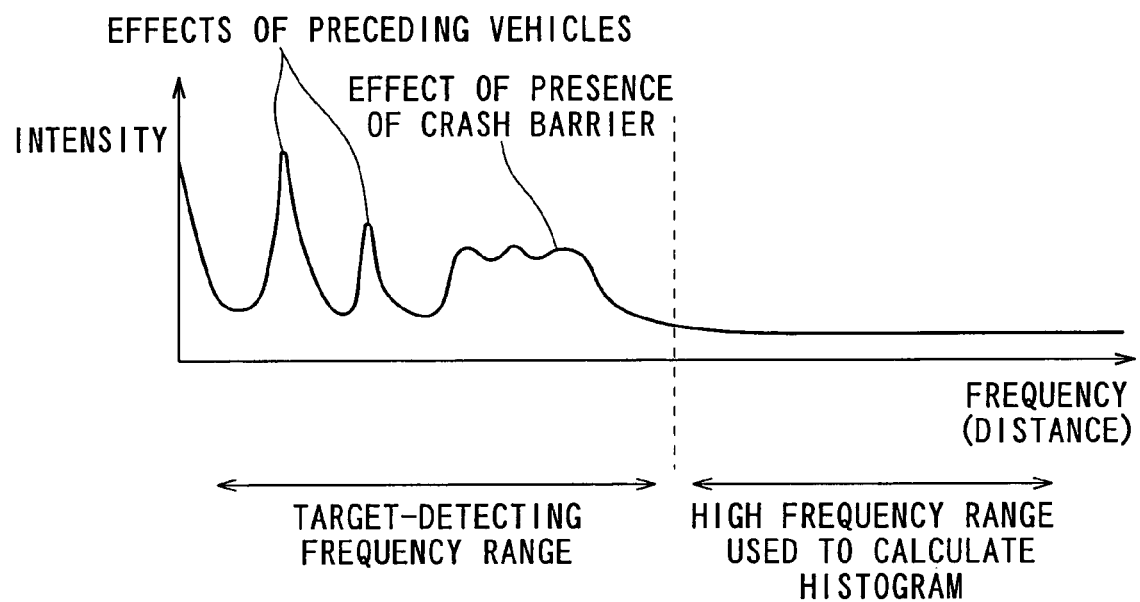
FIG. 6A is a graph showing an exemplary power spectrum characteristic of the beat signal without interference between the FMCW radar and some other radar and with no large target objects located far beyond the measuring range of the FMCW radar.

FIG. 6A is a graph showing an exemplary power spectrum characteristic of the beat signal without interference between the FMCW radar and some other radar and with no large target objects located far beyond the measuring range of the FMCW radar.

In this case, there is nothing to cause any rise in the noise floor level of the frequency spectrum characteristic of the beat signal.

Figure 6B:
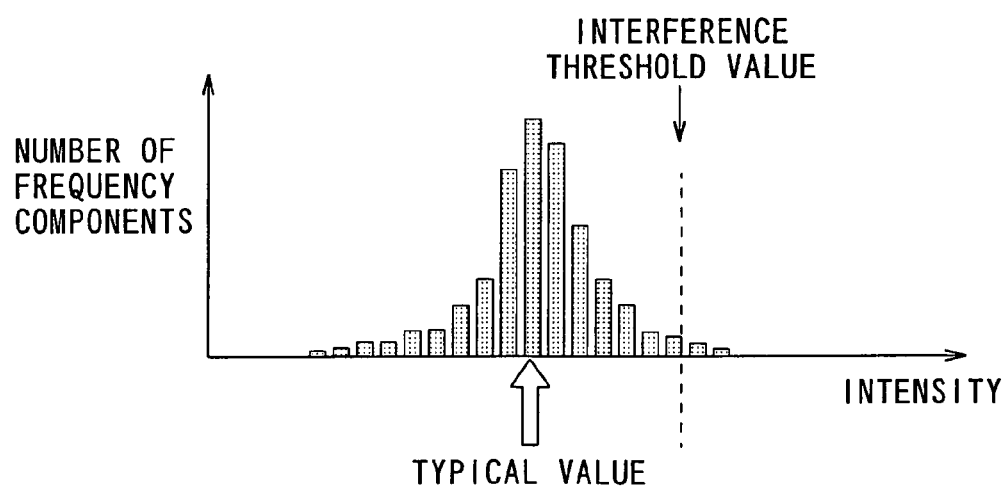
FIG. 6B is a graph showing an exemplary histogram of the intensities of frequency components of the beat signal without any interference between the FMCW radar and any other radar and no large target objects located far beyond the measuring range of the FMCW radar.

FIG. 6B is a graph showing an exemplary histogram of the intensities of frequency components of the beat signal without any interference between the FMCW radar and any other radar and no large target objects located far beyond the measuring range of the FMCW radar.

As can be seen in FIG. 6B, a typical power that has the maximum height in the histogram of the intensities of the frequency components of the beat signal B is lower than the predetermined interference threshold value. Thus, the method according to the present embodiment gives an accurate result of determination for occurrence of interference between the FMCW radar and some other radar.

Figure 7A:
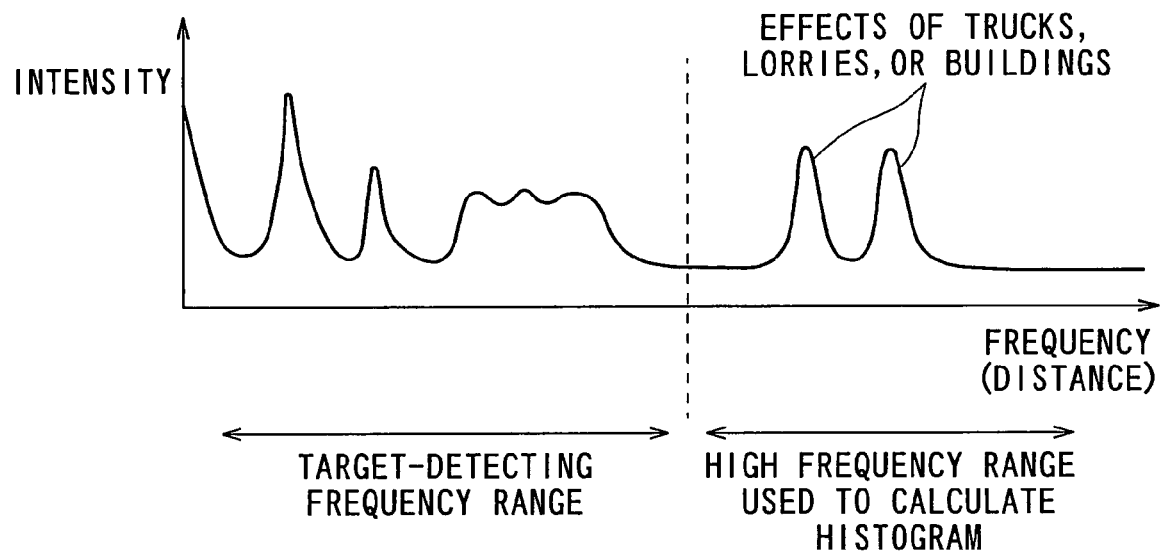
FIG. 7A is a graph showing an exemplary power spectrum characteristic of the beat signal when interference between the FMCW radar and some other radar does not occur and some large target objects are located far beyond the measuring range of the FMCW radar.

FIG. 7A is a graph showing exemplary power spectrum characteristic of the beat signal when no interference occurs between the FMCW radar and some other radar and some large target objects are located far beyond the measuring range of the FMCW radar.

In this case, the noise floor level is not increased due to interference between the FMCW radar and some other radar, but multiple giant peaks appear in a high frequency region beyond the maximum measurement frequency. In general, reflected radar waves from large target objects located far beyond the measuring region of the FMCW radar 2 do not have enough intensity below the maximum measurement frequency to give a typical power that has the maximum height in the histogram of the intensities of the frequency components of the beat signal B larger than the predetermined interference threshold value.

Figure 7B:
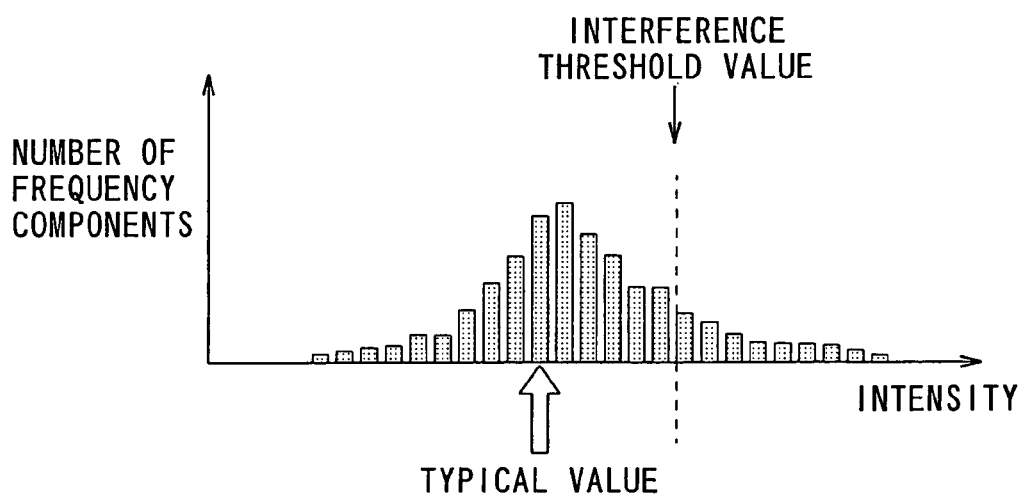
FIG. 7B is a graph showing an exemplary histogram of the intensities of frequency components of the beat signal when no interference occurs between the FMCW radar and another radar and some large target objects located far beyond the measuring region of the FMCW radar exist.

FIG. 7B is a graph showing an exemplary histogram of the intensities of frequency components of the beat signal when no interference occurs between the FMCW radar and another radar and some large target objects located far beyond the measuring region of the FMCW radar exist.

As shown in FIG. 7B, the typical power that has the maximum height in the histogram of the intensities of the frequency components of the beat signal B is lower than the predetermined interference threshold value. Thus, the method according to the present embodiment gives an accurate result of determination for occurrence of interference between the FMCW radar and some other radar.

In the last case where interference between the FMCW radar and some other radar occurs, the noise floor level is increased due to interference between the FMCW radar and some other radar because the effect of interference produces a broad peak in the frequency spectrum characteristic of the beat signal, especially in the high frequency region beyond the maximum measurement frequency.

Figure 8A:
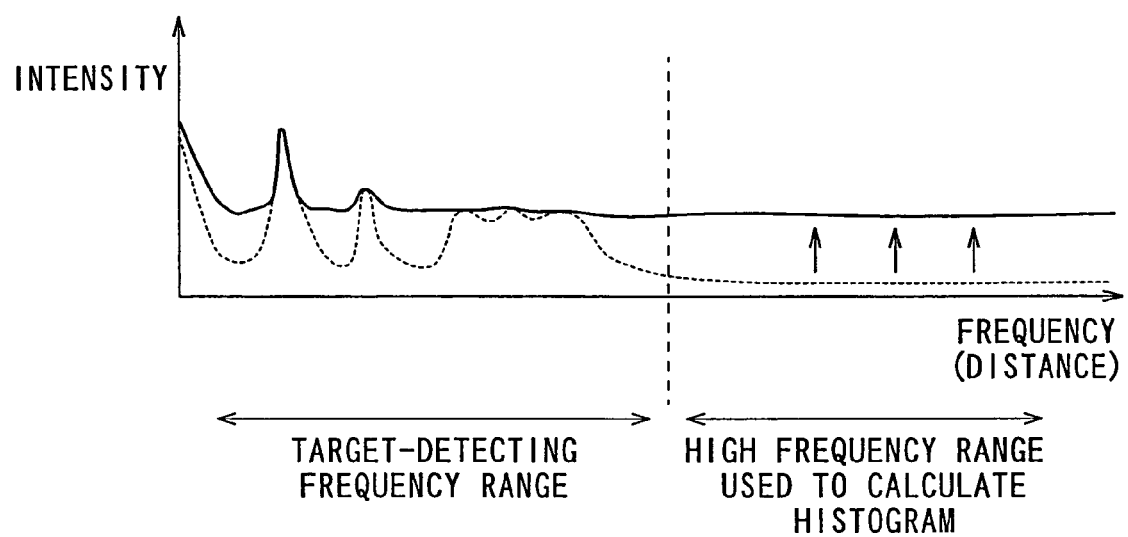
FIG. 8A is a graph showing an exemplary power spectrum characteristic of the beat signal when interference between the FMCW radar and some other radar occurs.

FIG. 8A is a graph showing exemplary power spectrum characteristic of the beat signal when interference between the FMCW radar and some other radar occurs.

Figure 8B:
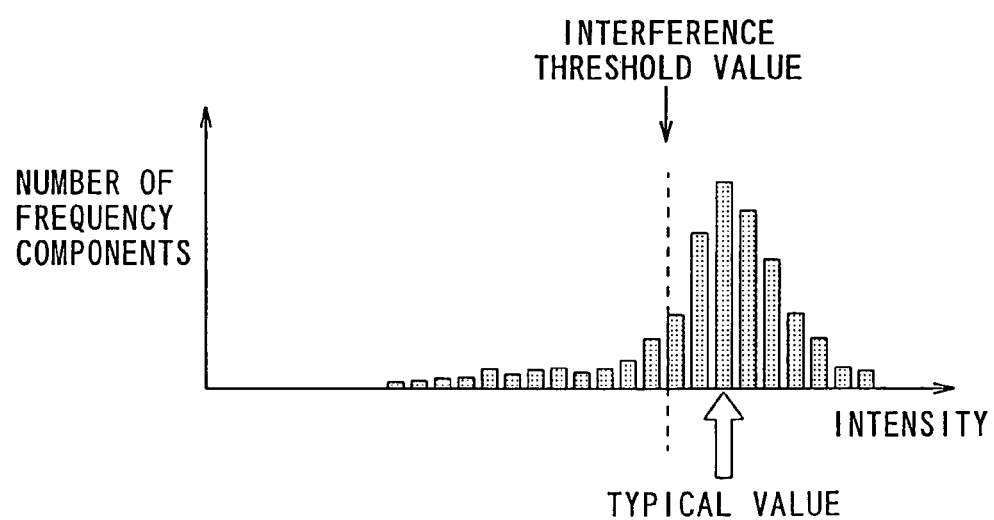
FIG. 8B is a graph showing an exemplary histogram of the intensities of frequency components of the beat signal when interference between the FMCW radar and some other radar occurs.

FIG. 8B is a graph showing an exemplary histogram of the intensities of frequency components of the beat signal when interference between the FMCW radar and some other radar occurs. Hence, the method according to the present embodiment works well even if large target objects, for example, large vehicles such as trucks and lorries, or buildings such as a freeway bridge and its piers are at a place further than the measuring range of the FMCW radar 2.

Referring to FIGS. 9 to 13, some advantages of the present embodiment will be explained in comparison with a comparative art which determines whether interference between the FMCW radar and some other radar occurs based on the integral of intensities of high frequency components in the frequency spectrum characteristic of the beat signal.

FIG. 9 is a flow chart showing a process for detecting the target object according to a comparative art.

In the flow chart shown in FIG. 9, steps S900, S910, 5940, S950, and S960 correspond to steps S110, S120, S160, S170, and S200 in the present embodiment shown in FIG. 5. Hence unknown steps that are needed to be explained can only be seen in steps S920 and 5930.

At step S920, integral values are calculated by integrating intensities of frequency components within a predetermined high frequency range with respect to each of the upward modulated section and the downward modulated section and with respect to each channel. If the maximum measurement frequency is set to the same value with that in the present embodiment, that is, 116 kilohertz which corresponds to 256 meters when the relative speed of the target object is zero, the predetermined high frequency range can be set to be 200 to 333 kilohertz.

Then, at step S930, it is determined whether the integral values calculated in step S920 are larger than a predetermined threshold. In the determination performed at step S930, it is sufficient to compare the predetermined value with one of the integral values for the upward modulated section and the downward modulated section.

The other steps have the same function with the corresponding steps in the method according to the present embodiment.

Instead of the integral values, it is possible to use a number of frequency components which are in the predetermined high frequency range and have an intensity exceeding a predetermined intensity threshold.

Figure 10:
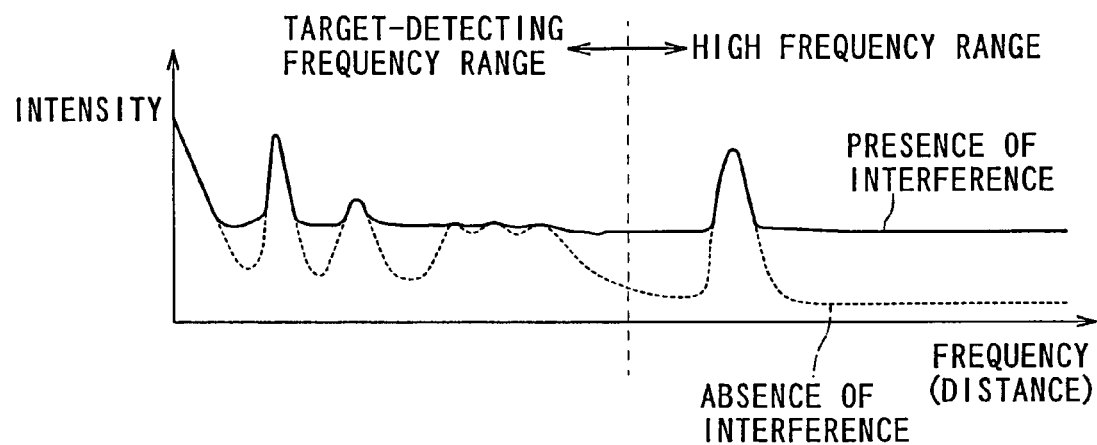
FIG. 10 is a graph showing an exemplary frequency spectrum characteristic of the beat signal when interference occurs between the FMCW radar and some other radar, the frequency spectrum characteristic of the beat signal having a high frequency range in which there is no influence from the target object located within the measuring range of the FMCW radar and a target-detecting frequency range in which there is some effect from a target object located within the measuring range of the FMCW radar.

FIG. 10 is a graph showing exemplary frequency spectrum characteristic of the beat signal when interference between the FMCW radar and some other radar occurs. In FIG. 10, the predetermined high frequency range can be seen. The lower limit of the predetermined high frequency range is the maximum measurement frequency below which frequency components corresponding to the target object within the measuring range of the FMCW radar 2 are positioned.

Figure 11:
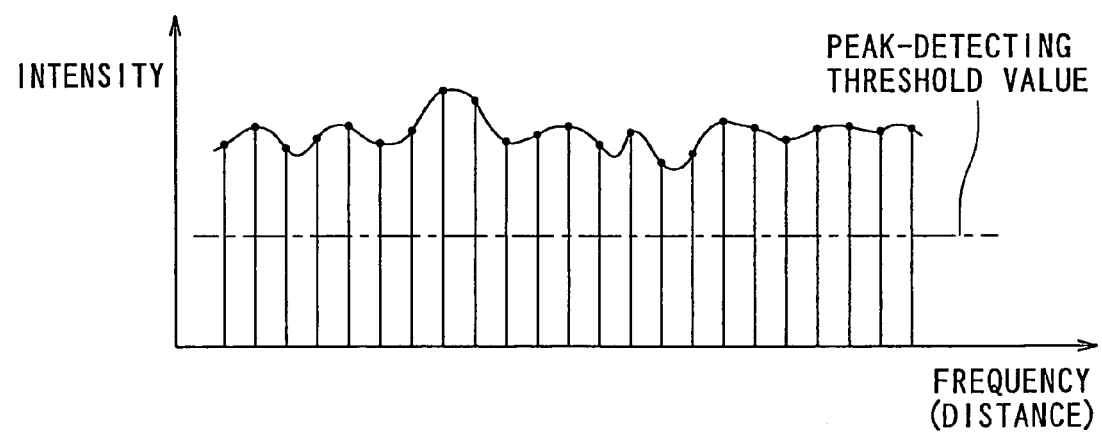
FIG. 11 is a graph showing an exemplary frequency spectrum characteristic of the beat signal in the high frequency range when interference between the FMCW radar and some other radar occurs.

FIG. 11 is a graph showing exemplary frequency spectrum characteristic of the beat signal in the high frequency range when interference between the FMCW radar and some other radar occurs. It can be seen that in the whole high frequency range the noise floor level is raised. Hence, the frequency components which have an intensity exceeding a predetermined intensity threshold are found in the whole of the high frequency range. Thus, the method according to the comparative art gives an accurate result of determination of the occurrence of interference by some other radar in this case.

Figure 12:
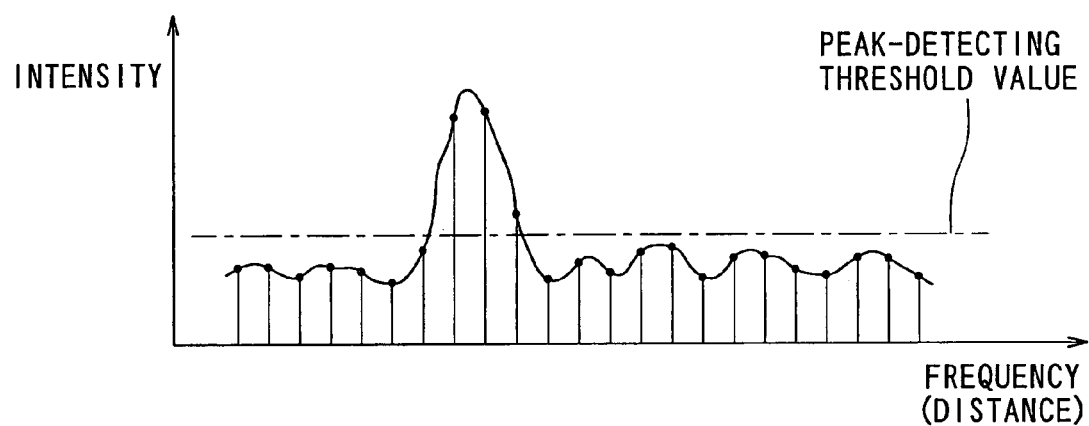
FIG. 12 is a graph showing an exemplary frequency spectrum characteristic of the beat signal in the high frequency range when no interference between the FMCW radar and some other radar occurs and no large target objects located far beyond the measuring region of the FMCW radar exist.

FIG. 12 is a graph showing an exemplary frequency spectrum characteristic of the beat signal in the high frequency range when no interference between the FMCW radar and other radar(s) occurs and no large target objects located far beyond the measuring region of the FMCW radar exist. In this case, the noise floor level is below the predetermined intensity threshold except in a frequency range where the effect of the target object appears. Thus, it is possible to determine whether interference between the FMCW radar and some other radar occurs. That is, the method according to the comparative art gives an accurate result of determination of the occurrence of interference by some other radar in this case.

Figure 13:
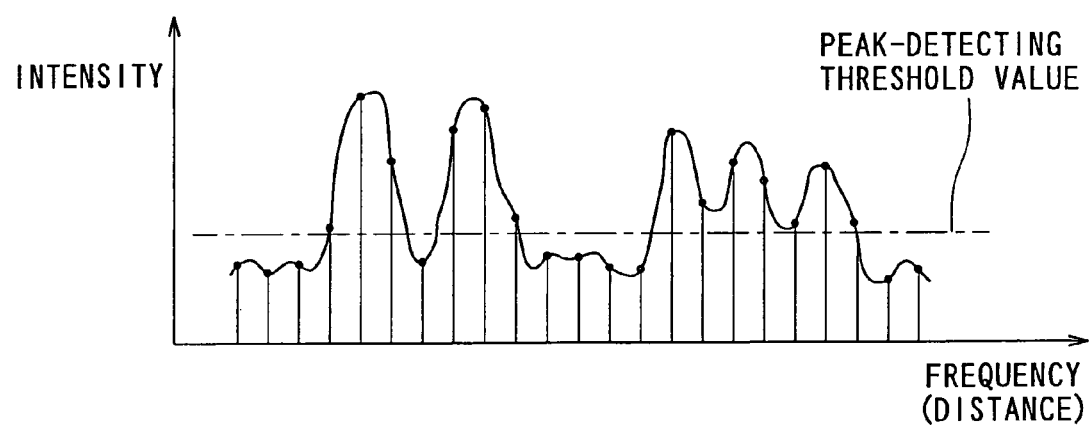
FIG. 13 is a graph showing an exemplary frequency spectrum characteristic of the beat signal in the high frequency range when no interference between the FMCW radar and some other radar occurs and there are some large target objects located far beyond the measuring region of the FMCW radar.

FIG. 13 is a graph showing exemplary frequency spectrum characteristic of the beat signal in the high frequency range when interference between the FMCW radar and some other radar does not occur and some large target objects located far beyond the measuring region of the FMCW radar exist. The large target objects located far beyond the measuring region of the FMCW radar influence the frequency spectrum characteristic of the beat signal such that multiple narrow peaks which have intensities exceeding the predetermined intensity threshold are generated in the high frequency range. In this case, although interference between the FMCW radar and some other radar does not occur, both the integral values of intensities of frequency components within a predetermined high frequency range and the number of frequency components which are in the predetermined high frequency range and have an intensity exceeding a predetermined intensity threshold are increased. Hence, large target objects located far beyond the measurement region of the FMCW radar sometimes results in erroneous determinations of occurrence of interference by some other radar.

However, as described above, especially as shown at step S140 in FIG. 5, the method according to the present embodiment can estimate accurately the noise floor level. The improvement of accuracy of the determination of the noise floor level leads to reliably determine whether or not the large target objects located far beyond the measuring region of the FMCW radar.

A method according to the present embodiment for a frequency modulated continuous wave (FMCW) radar for estimating a noise floor level that is increased in response to occurrence of interference between the FMCW radar and some other radar occurs includes steps of: analyzing a beat signal, generating a histogram, and detecting a noise floor level.

In the step for analyzing the beat signal, the beat signal obtained by mixing the received signal Sr which relates to the amplitude of the reflected radar wave from a target object and the local signal L which relates to the radio frequency signal generated by the oscillator 12 is converted to digital data using a technique of digitizing the amplified beat signal, for example, by sampling the magnitude of the amplified beat signal at a predetermined sampling frequency to obtain frequency spectrum characteristic or a power spectrum of the beat signal. The frequency of the radio frequency signal is modulated so as to be linearly increased within the upward modulated section, and then be linearly decreased within the downward modulated section.

In step for generating the histogram, using the frequency spectrum characteristic of high frequency components of the beat signal, a histogram of the intensities of high frequency components of the beat signal is obtained.

In step for detecting the noise floor level, a value of the intensity or power of the beat signal which has the maximum height in the histogram is detected as a noise floor level.

Therefore, even if even large or long target objects, for example, large vehicles such as trucks and lorries, or buildings such as a freeway bridge and its piers are at a place further than the measuring range of the FMCW radar 2, the influence of such the large or long target objects can not be seen in the frequency spectrum characteristic of the beat in the high frequency range, because intensities of frequency components affected by such objects do not exceed the noise floor level.

A method according to the present embodiment for a frequency modulated continuous wave (FMCW) radar for detecting occurrence of interference between the FMCW radar and some other radar includes steps of: analyzing a beat signal containing information about a target object, detecting peak frequencies, calculating target characteristic including the downrange distance to the target object and the relative speed of the target object to the radar based on the peak frequencies, generating a histogram, detecting a noise floor level, detecting interference, and taking measures against interference.

In the step for analyzing the beat signal, the beat signal obtained by mixing the received signal Sr which relates to the amplitude of the reflected radar wave from a target object and the local signal L which relates to the radio frequency signal generated by the oscillator 12 is converted to digital data using a technique of digitizing the amplified beat signal, for example, by sampling the magnitude of the amplified beat signal at a predetermined sampling frequency to obtain a frequency spectrum characteristic or a power spectrum of the beat signal. The frequency of the radio frequency signal is modulated so as to be linearly increased within the upward modulated section, and then be linearly decreased within the downward modulated section.

In the step for detecting peak frequencies, a frequency component which is below the maximum measurement frequency and whose power exceeds a predetermined threshold value is detected as a peak frequency with respect to each of the upward modulated section and the downward modulated section. The peak frequency with respect to the upward modulated section is referred as to a first peak frequency, and another peak frequency with respect to the downward modulated section is referred as to a second peak frequency.

In the step for calculating the target characteristic of the target object, at least the distance to the target object and the relative speed of the target object are calculated based on the first and second peak frequencies.

In the step for generating the histogram, using the frequency spectrum characteristic of high frequency components of the beat signal, a histogram of the intensities of the high frequency components of the beat signal is obtained.

In the step for detecting the noise floor level, the value of the intensity or power of the beat signal which has the maximum height in the high frequency region in the histogram is detected as a noise floor level.

In the step for detecting interference, if the noise floor level exceeds a predetermined interference threshold value, it is determined that some interference by some other radar is present.

In the step for taking measure against interference, some measure is taken against the interference by some other radar.

Therefore, it is possible to reliably determine whether or not large target objects are located far beyond the measuring region of the FMCW radar because the accuracy of the determination of the noise floor level is improved. Thus, countermeasures against interference can be taken in a timely manner.

Modification

The present invention may be embodied in several other forms without departing from the spirit thereof. The embodiment described so far is therefore intended to be only illustrative and not restrictive, since the scope of the present invention is defined by the appended claims rather than by the description preceding them. All changes that fall within the metes and bounds of the claims, or equivalents of such metes and bounds, are therefore intended to be embraced by the claims.

For example, in the above mentioned embodiment, an alarm is notified to the driver when it is impossible to detect target objects from a vehicle equipped with the FMCW radar 2 at step S200 in FIG. 5. However, it is possible to execute steps S160 to S190 using a redefined noise floor level obtained by adding some margin to the noise floor level. In this case, the peak frequencies whose intensities exceed the noise floor level can be used to estimate the target characteristic of a target object, even if either interference between the FMCW radar and some other radar occurs or some influence from some large or long target objects such as trucks and lorries, or large and long buildings such as a freeway bridge and its piers located beyond the measuring region of the FMCW radar appears in the frequency spectrum characteristic of the beat signal.

Further, it is preferable to execute steps S160 to S190 using a redefined noise floor level obtained by adding some margin to the noise floor level when interference between the FMCW radar and some other radar occurs.

What is claimed is:

1. A method for determining a noise floor level in analyzing an incident radio wave which is received and translated by a radar into an electric signal and which includes a return of a radar wave as having been transmitted by the radar and reflected from a target object within a measuring distance range of the radar, comprising steps of:

performing frequency analysis on the electric signal to derive a distribution of intensities of frequency components of the electric signal;

calculating a histogram of the intensities of ones of the frequency components which are out of a given frequency range in which the return of the radar wave from the target object is to fall; and determining one of the intensities having a maximum height in the histogram of the intensities of the frequency components as the noise floor level.

2. The method according to claim 1, wherein
the radar is a frequency modulated continuous wave (FMCW) radar that transmits a frequency-modulated radar wave whose frequency changes in time, the radar wave having an upward modulated section during which the frequency of the radar wave increase in time and a downward modulated section during which the frequency of the radar wave decrease in time, the electric signal includes a first beat signal and a second beat signal which are generated by mixing the incident radio wave received by the radar and the radar wave transmitted from the radar in the upward modulated section and in the downward modulated section, respectively, and at least one of the first and second signals is used to calculate the histogram of intensities of frequency components of the beat signal.

3. The method according to claim 2, wherein
the FMCW radar has a plurality of receiving antennas to receive the incoming radio wave to generate a plurality of beat signals, each beat signal responsive to component of the incoming radio wave received by the corresponding receiving antenna, and the histogram of intensities of frequency components of the beat signal is calculated by using the plurality of the beat signals.

4. A frequency modulated continuous wave (FMCW) radar that detects a target object characteristic including at least one of presence of a target object within a measuring range of the radar, a distance between the target object and the radar, and a relative speed of the target object to the radar, comprising:

a transmission signal generator that generates a transmission signal whose frequency is modulated so as to have a upward modulated section during which the frequency of the transmission signal increase in time and a downward modulated section during which the frequency of the transmission signal decrease in time;

a transmission antenna that transmits the transmission signal as a radar wave in direction of the measuring range, the measuring range being limited the farthest distance thereof which correspond to a maximum measurement frequency;

a reception antenna unit that receives an incident radio wave including a return of the radar wave from the target object located within the measuring range of the radar so as to generate a received signal based on the incident radio wave;

a beat signal generator that generates a first and second beat signals with respect to each of the upward modulated section and the downward modulated section, respectively, based on both the transmission signal and the received signal;

an frequency analyzer that performs frequency analysis on the first and second beat signals to obtain a first and a second frequency spectrum characteristic thereof which show distribution of intensities of the beat signal in frequency domain with respect to the upward modulated section and the downward modulated section, respectively;

a histogram calculator that calculates a histogram of intensities of frequency components, which frequency components exceeding the maximum measurement frequency, based on at least one of the first and second frequency spectrum characteristic of the beat signal;

a noise floor level detector that detects a typical intensity that has a maximum height in the histogram of intensities of frequency components as the noise floor level;

a peak frequency detector that detect a first and second peak frequencies which has respective highest intensities in the first and second frequency spectrum characteristic, respectively, if the first and second peak frequencies are below the maximum measurement frequency and have their intensities larger than a value determined as a function of the noise floor level; and
a target object characteristic calculator that calculates the target object characteristic based on the first and second peak frequencies.

5. The radar according to claim 4, wherein
the reception antenna unit includes a plurality of receiving antennas to generate a plurality of received signals, each received signal being generated from the incoming radar wave passing through the corresponding receiving antenna,
the beat signal generator that generates a plurality of first beat signals and second beat signals, each first beat signal relating to the incoming radar wave passing through the corresponding receiving antenna and the radar wave transmitted within the upward modulated period, and each second beat signal relating to the incoming radar wave passing through the corresponding receiving antenna and the radar wave transmitted within the downward modulated period, based on the plurality of received signals and transmission signal.

6. The radar according to claim 5 further comprising:
an interference detector that detect occurrence of interference between the FMCW radar and some other radar based on a result of whether or not the noise floor level exceeds a predetermined interference threshold value.

7. The radar according to claim 4, wherein
the FMCW radar is a vehicle-mounted radar.

8. A interference detecting device for a frequency modulated continuous wave (FMCW) radar which device determines whether interference between the FMCW radar and some other radar occurs, comprising:
a transmission signal generator that generates a transmission signal whose frequency changes in time;
a transmission antenna that transmits the transmission signal as a radar wave in direction of a measuring range of the FMCW radar, the measuring range being limited the farthest distance thereof which correspond to a maximum measurement frequency;
a reception antenna unit that receives an incident radio wave including a return of the radar wave from the target object located within a measuring range of the radar, so as to generate a received signal based on the incoming radio wave;
a beat signal generator that generates a beat signal based on the transmission signal and the received signal;
a frequency analyzer that executes frequency analysis on the beat signal to obtain a frequency spectrum characteristic thereof which show distribution of intensities of the beat signal in frequency domain;
a histogram calculator that calculates a histogram of intensities of frequency components, which frequency components exceeding the maximum measurement frequency, based on the frequency spectrum characteristic of the beat signal;
a noise floor level detector that extracts a typical intensity whose intensity has the maximum height in the histogram of intensities of frequency components of the beat signal as the noise floor level; and
an interference detector that detects occurrence of interference between the FMCW radar and some other radar based on a result of whether or not the noise floor level exceeds a predetermined value.

9. The radar according to claim 8, wherein
the reception antenna unit includes a plurality of receiving antennas to generate a plurality of received signals, each received signal being generated from the incident radar wave passing through the corresponding receiving antenna,
the beat signal generator that generates a plurality of first beat signals and second beat signals, each first beat signal relating to the incident radar wave passing through the corresponding receiving antenna and the radar wave transmitted within the upward modulated section, and each second beat signal relating to the incident radar wave passing through the corresponding receiving antenna and the radar wave transmitted within the downward modulated section, based on the plurality of received signals and transmission signal.

10. The device according to claim 9, further comprising:
a peak frequency detector that detect a first and second peak frequencies which has respective highest intensities in the first and second frequency spectrum characteristic if the first and second peak frequencies are below the maximum measurement frequency and have their intensities larger than a functional value of the noise floor level; and
a target object characteristic calculator that calculates the target object characteristic including a distance of a target object located within a measuring range of the radar and a relative speed between the target object and the radar based on the first and second peak frequencies.

* * * * *